US006601020B1

(12) United States Patent
Myers

(10) Patent No.: US 6,601,020 B1
(45) Date of Patent: Jul. 29, 2003

(54) SYSTEM LOAD TESTING COORDINATION OVER A NETWORK

(75) Inventor: Monty G. Myers, Austin, TX (US)

(73) Assignee: Eureka Software Solutions, Inc.

( * ) Notice: Subject to any disclaimer, the term of this patent is extended or adjusted under 35 U.S.C. 154(b) by 0 days.

(21) Appl. No.: 09/565,062

(22) Filed: May 3, 2000

(51) Int. Cl.[7] .............................................. G06F 11/00
(52) U.S. Cl. ..................................... 702/186; 455/67.4
(58) Field of Search ................................ 702/186, 187, 702/57, 81, 84, 108, 117, 118, 176, 178, 179, 182; 340/286.01, 286.02; 455/405, 423, 67.4; 709/223, 224, 105, 225, 226; 714/25, 26, 27, 31

(56) References Cited

U.S. PATENT DOCUMENTS

| | | | | |
|---|---|---|---|---|
| 5,889,955 A | * | 3/1999 | Shinozaki et al. | .......... 709/224 |
| 5,974,572 A | * | 10/1999 | Weinberg et al. | ............. 714/47 |
| 6,434,513 B1 | * | 8/2002 | Sherman et al. | ............ 702/186 |
| 6,470,383 B1 | * | 10/2002 | Leshem et al. | ............. 709/223 |
| 6,516,348 B1 | * | 2/2003 | MacFarlane et al. | ........ 709/224 |

* cited by examiner

Primary Examiner—Marc S. Hoff
Assistant Examiner—Edward Raymond
(74) Attorney, Agent, or Firm—Koestner Bertani LLP

(57) ABSTRACT

A method and system using one or more load cells coordinates load testing of one or more sites under test over a network such as the Internet in accordance with one or more load test requests. In one embodiment, such method and system facilitates an economic, efficient, and accurate evaluation of the capacity of the SUTs to support concurrent users of the SUTs. A load test request is received from a User and provides information concerning a load test to be performed on a site under test (SUT). A load test is generated, and the load test is allocated to one or more load cells. The load cells perform the load test by sending load test data to the SUT and receiving responses from the SUT. Portions of a load test may be allocated to different load cells, which may be geographically remote from the SUT and/or geographically diverse. Multiple concurrent pending load tests may be processed for the same SUT. A load cell may concurrently perform all or a portion of multiple different load tests for multiple different SUT's simultaneously. A reporting function generates a report based on the responses received from the SUT. The reporting function may in addition or alternatively allow the User to view real-time results during load test execution.

81 Claims, 21 Drawing Sheets

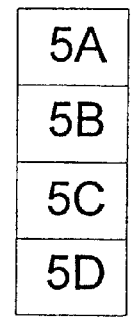
FIG. 5
*FIG. 5A*
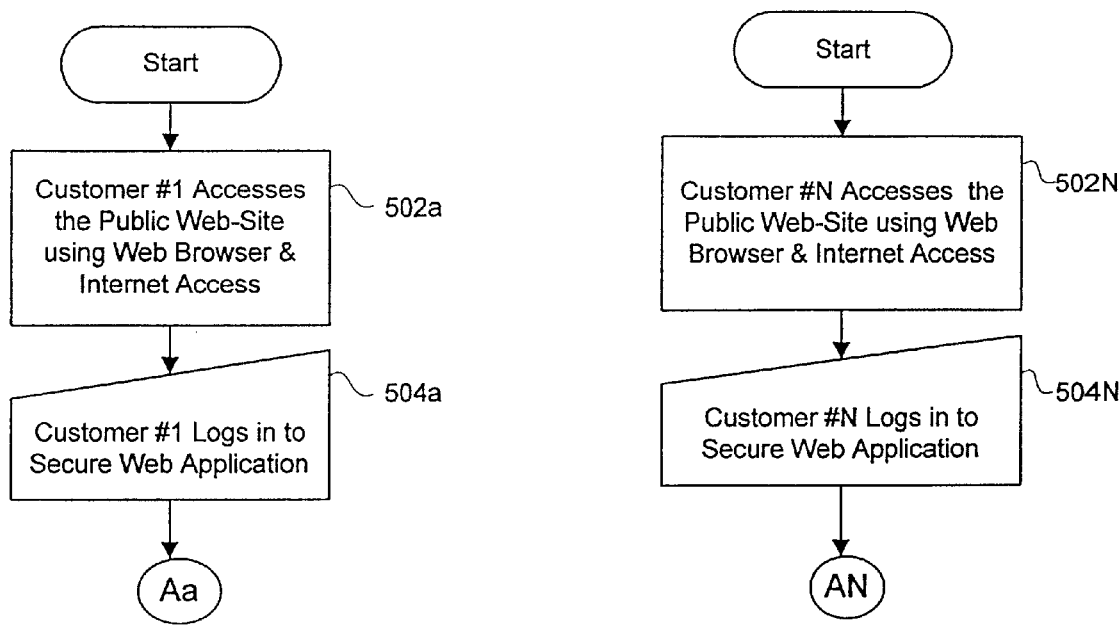

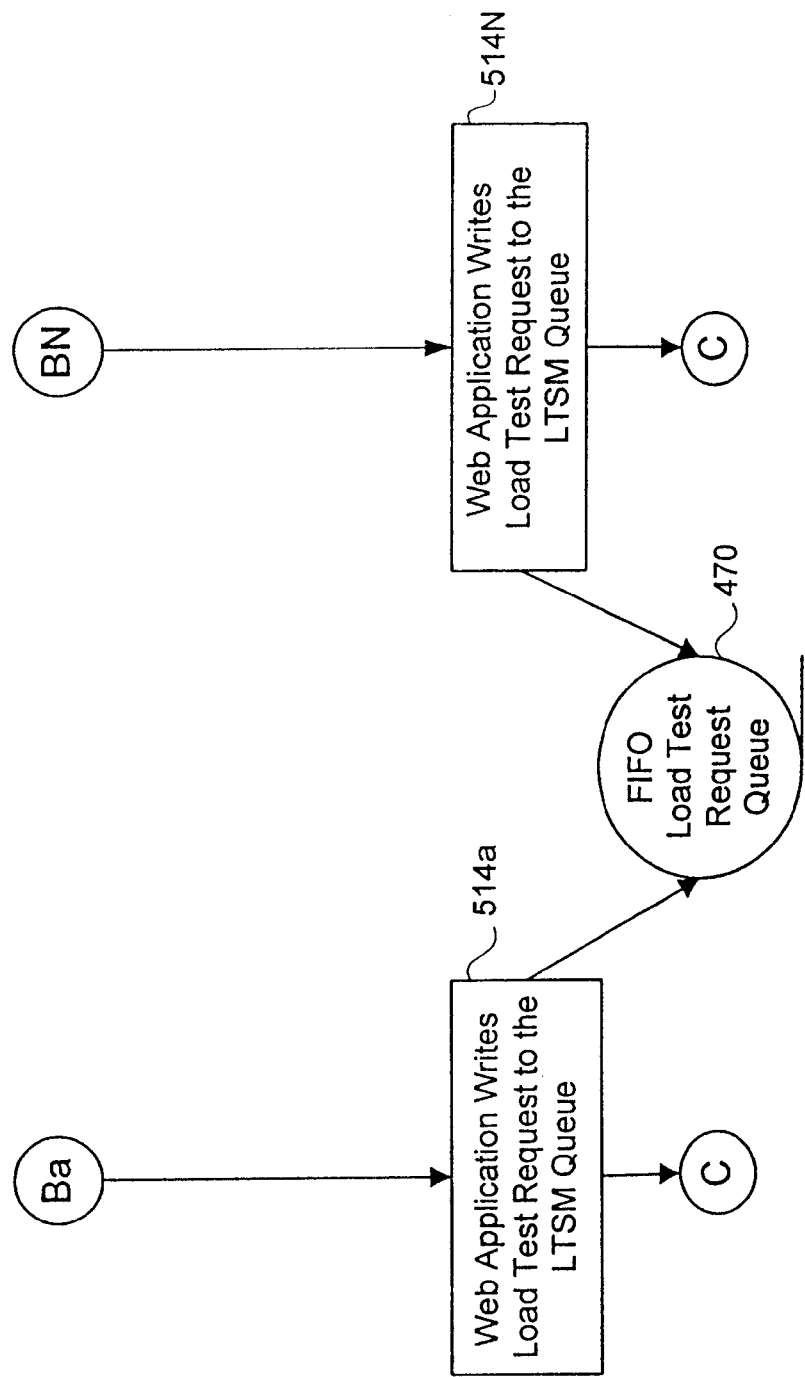

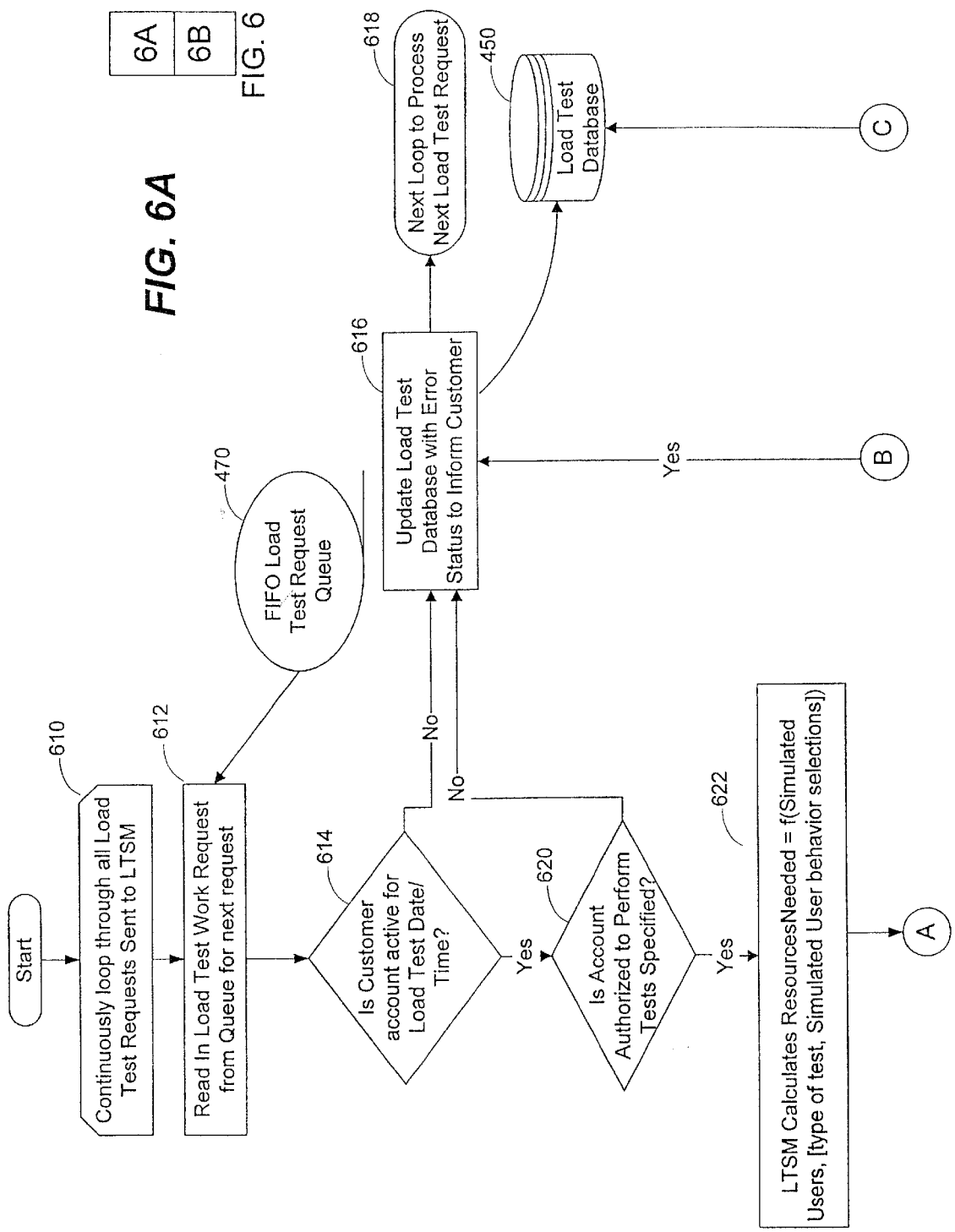

SYSTEM LOAD TESTING COORDINATION OVER A NETWORK

BACKGROUND OF THE INVENTION

1. Field of the Invention

This invention relates generally to computerized load testing and more particularly to a method and system for coordinating load testing of one or more sites under test over a network.

2. Description of the Related Art

Networks, such as the Internet, Intranets, and Extranets are fundamentally changing the way people and businesses communicate and transact with one another. The incredible growth of this new communications medium is well documented and many new applications are being invented at a phenomenal pace. The Internet is now used to provide informational Web-sites (e.g., drkoop.com™), portals/meta-sites (e.g., Yahoo!™), on-line auctions (e.g., ebay.com™), and collaborative communities (e.g., geocities.com™), and others. Traditional "brick and mortar" businesses are moving on-line as well, providing such products and services as electronic commerce sites (e.g., amazon.com™), on-line stock trading (e.g., schwab.com™), and banking (e.g., citibank.com™). Ubiquitous corporate Intranets and Extranets utilizing Internet technologies provide similar applications and services to an internal or limited group of individuals and/or partners.

In a network environment, multiple users of client systems "load" a host system by concurrently accessing the host system and placing various computing and communication demands on the host system. The ability to accept multiple concurrent accesses and accurately respond to the communication demands in a timely manner provide two key host system performance parameters. The dramatic success and continued growth of the Internet and the applications being built upon it have resulted in a substantial and increasing number of users accessing Web application host sites and, thus, an increase in the loads experienced by such sites. Thus, one of the key challenges facing Internet system hardware architects and application builders is how to design, build, and test a Web site to scale to meet ever growing user "load" while maintaining satisfactory host system performance parameters.

The scalability of a host system, such as a Web application host site, is generally defined by two parameters: the maximum load achievable while maintaining: (1) host system reliability; and (2) acceptable host system response times. It can be quite straightforward to build a simple e-Commerce Web site to market or sell a product, but it is quite another to do so in a scalable, high-performance, reliable fashion. Several highly-publicized problems have been recently documented at leading Web sites. In fact, the Newport Group, a Massachusetts-based research company, currently estimates that 52 percent of all Web applications fail to scale—meaning they don't perform acceptably under real-world usage increases.

Although host systems have been designed and implemented for many years, effectively, efficiently, and economically determining host system scalability has proved generally elusive. Several factors associated with Internet host systems contribute to making scalability an elusive, ever changing goal. First, the rapid growth trends and adoption of the Internet in general forces Internet host system builders to continually upgrade and reassess their ability to scale. A second factor stems from the challenging time-to-market pressures facing Web-centric companies, where predicting scalability can give way to the first and foremost goal of publicly activating the host systems. Third, new Web application technologies introduce increasing demands upon the technology infrastructure that companies have set up to provide their Internet presence. Broadband Internet connectivity, streaming audio/video, and voice-over-IP are examples of new Web application technologies which will make scaling Internet applications even more difficult. Fourth, technologies and requirements are advancing rapidly enough that human resources with adequate problem domain and solution knowledge for optimal Internet implementation and performance are scarce commodities in the current information technology workforce.

Load testing of Web applications can empirically determine host system scalability. However, effective, efficient, and economical Internet host system load testing has proved quite challenging. Traditionally, Web host application sites were load tested manually, which is neither a simple nor practical task. Using a manual approach to test an Internet host site under a load of 10,000 users would require hiring 10,000 people and giving them all a computer and network (intranet) or Internet access to the site to be tested. An additional drawback is that manual testing is non-repeatable in that the actions of large numbers of users are not predictable (repeatability being a hallmark of good testing practice).

In order to address some of the drawbacks of manual load testing, several contemporary vendors have developed load test applications that can simulate hundreds and even thousands of users accessing an Internet application. These tools commonly allow user behavior to be defined using some type of programmable script.

Many, if not all, load test tools are inadequate to address the needs of Internet site load testing. For instance, typical load testing tools are not optimized to test via the Internet and thus do not take in consideration the effects of the public nature of the Internet in performance. In addition, typical load test tools are limited (or at least untested) in their ability to truly simulate beyond a few thousand simultaneous users. Another drawback is that typical load testing tools can only effectively test one, independent target system at a time within an organization or a group of organizations. Therefore, typical conventional tools are unable to test multiple sites simultaneously.

SUMMARY OF THE INVENTION

In one embodiment, the present invention includes a method of load testing at least one site under test (SUT) in accordance with at least one load test request. The load test request provides information for load testing the at least one SUT. The load test request is reviewed, and a load test corresponding to the load test request is generated. The load test is allocated among a plurality of load cells. Load test data is sent, in accordance with the load test, from the plurality of load cells to the at least one SUT. Response data from the SUT is received by the load cells. At least one embodiment of the method further includes generating a load test report based on the response data. Another embodiment of the method provides for receiving and reviewing a plurality of load test requests pertaining to a SUT. A further embodiment of the method provides for receiving and reviewing a plurality of load test requests for each of a plurality of SUTs.

In another embodiment, the present invention includes a computer-readable medium having a computer program accessible therefrom, the computer program including instructions for performing the method of load testing the site(s) under test in accordance with the load test request(s). Note: [object] [s] means at least one [object]. The computer-readable medium includes any of the following: a magnetic storage medium, including disk and tape storage medium; an optical storage medium, including compact disk memory and a digital video disk storage medium; a nonvolatile memory storage memory; a volatile storage medium; and data transmission medium including packets of electronic data and electromagnetic waves modulated in accordance with the instructions.

Allocating the load test among the plurality of load cells includes, in at least one embodiment, determining whether a sufficient number of load cells are available to collectively conduct the load test request and, if so, distributing the load test among the available load cells until the load test is fully allocated. In at least one embodiment, the load cells to which the load test is allocated are geographically remote from the SUT.

In addition to the method discussed above, another embodiment of the invention includes a network system to load test at least one SUT in accordance with at least one load test request submitted by a user system. The network system includes at least one computer. The computer includes circuitry to receive a load test request from the user system. The computer also includes a memory and a processor that are electronically coupled to each other. In an alternative embodiment, the processor further includes circuitry to receive, via the Internet, a load test request from a user system.

The network system also includes program code. The program code is stored in the memory on the computer and is executable by the processor. The program code includes instructions for reviewing the load test request and for generating a load test based on the load test request. The program code also includes instructions for allocating the load test among a plurality of load cells and for sending load test data from the load cells to the at least one SUT. The program code also includes instructions for receiving responses from the SUT and for generating a load test report based upon the received responses. Another embodiment of the network system provides that the program code is logically partitioned into a plurality of functional subsystems. The functional subsystems include a public web site layer, a private web site layer, a load test database, a load test system manager, a work allocator, and a data collection system.

Another embodiment of the network system provides that the load test database (one of the functional subsystems mentioned above) is capable of storing login information, security information, captured user simulation scripts, and scenarios. A further embodiment of the load test database further provides that the load test database includes a relational database server.

A further embodiment of the network system provides that each load cell in the plurality of load cells includes a load cell manager, a load cell test executive, and a data buffer coupled to both the load cell manager and the load cell test executive.

Another embodiment of the invention includes an apparatus including a means for reviewing at least one load test request. The at least one load test request includes information for load testing at least one SUT. The apparatus also includes a means for generating a load test for each of the load test requests. The apparatus also includes a means for allocating the load tests to a plurality of load cells and a means for sending load test data from the load cells to the at least one SUT. The apparatus also includes a means for receiving responses from the SUT regarding the load test data.

Another embodiment of the present invention includes an apparatus for load testing at least one SUT in accordance with at least one load test request. The load test request is generated with a user data processing system. The apparatus includes a plurality of load cells capable of communicating with the SUT. The apparatus also includes a load test system. The load test system is capable of communicating with the plurality of load cells and with the user data processing system. The load test system includes a work allocator. The work allocator is capable of receiving the at least one load test request and is also capable of querying the plurality of load cells to select a group of load cells that is available to collectively process the load test request. The work allocator is also capable of selecting the group of load cells to collectively process the load test request.

Another embodiment of the invention includes a method of load testing a plurality of SUT's, wherein the load is not necessarily allocated among a plurality of load cells. The load is allocated to at least one load cell. At least one embodiment provides for reviewing and processing at least one load test, where the load test request indicates load testing for a plurality of SUT's. At least one embodiment further provides for reviewing and processing multiple load test requests for the plurality of SUT's.

Another embodiment of the invention includes a system to load test a plurality of SUT's, wherein the load is not necessarily allocated among a plurality of load cells. Another embodiment of the invention includes a computer-readable storage medium having a computer program with instructions for load testing a plurality of SUT's. Another embodiment of the invention includes an apparatus capable of load testing a plurality of SUT's, where the load is allocated to at least one load cell. Another embodiment of the invention includes another apparatus capable of load testing a plurality of SUT's, where the load test request is generated with a user data processing system.

Another embodiment of the invention includes a method for load testing at least one SUT in accordance with a plurality of pending load test requests relating to the same SUT. The multiple pending load tests may provide for concurrent load testing of the SUT, or staggered testing. Another embodiment of the present invention includes a network system to load test at least one SUT in accordance with multiple pending load test requests. Another embodiment of the invention includes a computer-readable storage medium having a computer program with instructions for load testing at least one SUT in accordance with a plurality of concurrently-pending load test requests. Another embodiment of the invention includes an apparatus capable of load testing at least one SUT in accordance with a plurality of concurrently-pending load test requests. Another embodiment of the invention includes another apparatus capable of load testing at least one SUT in accordance with a plurality of load test requests, where the load test requests are generated with a user data processing system.

PREFERRED EMBODIMENTS OF THE DRAWINGS

Embodiments of the present invention may be better understood, and numerous objects, features, and advantages made apparent to those skilled in the art by referencing the accompanying drawings.

FIGS. 5A, 5B, 5C, and 5D are flowcharts illustrating user interaction with one embodiment of a load testing system.

Figure 6B:
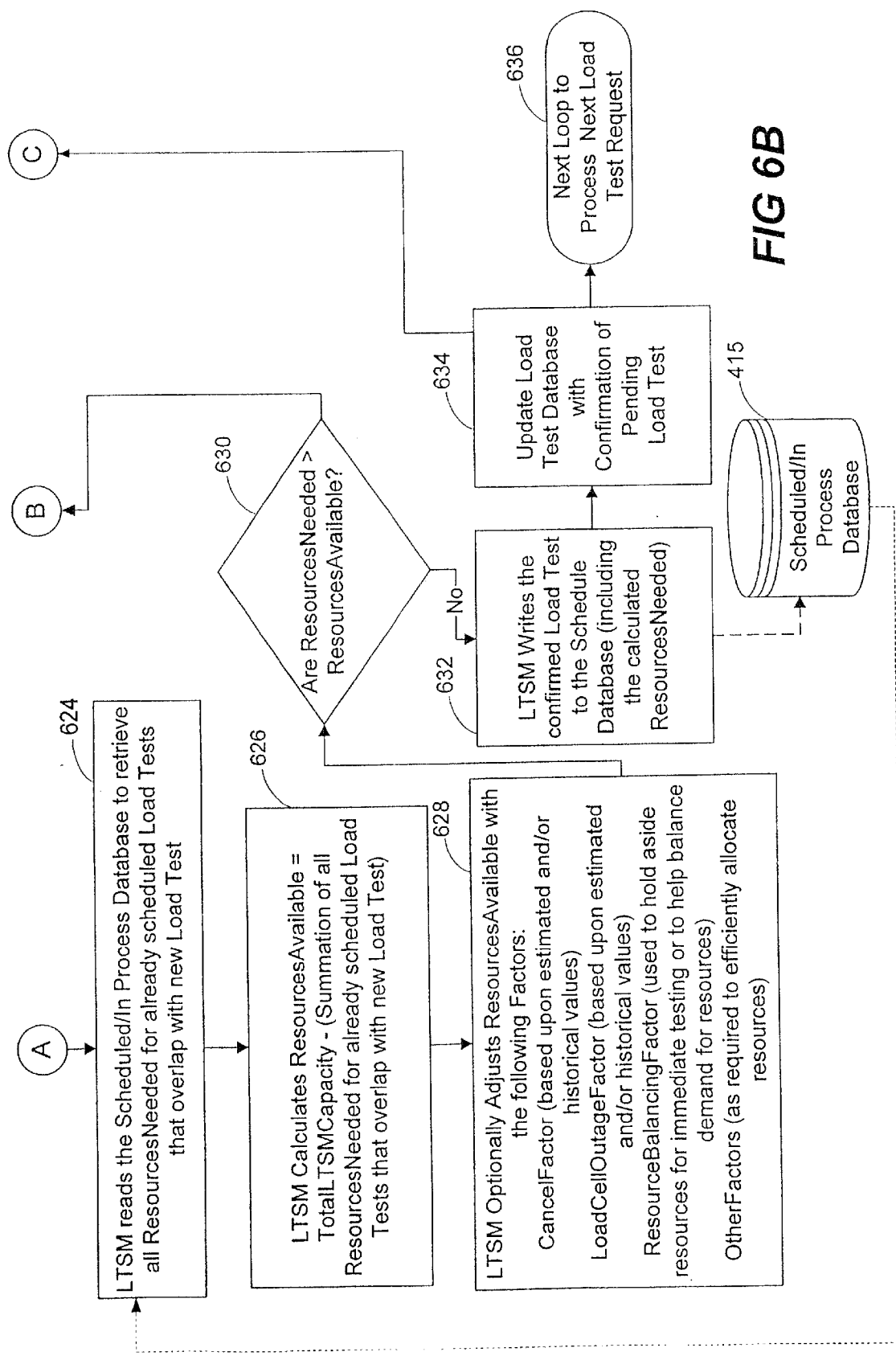

FIGS. 6A and 6B are flowcharts illustrating load test processing performed in at least one embodiment of a load test system manager.

Figure 7A:
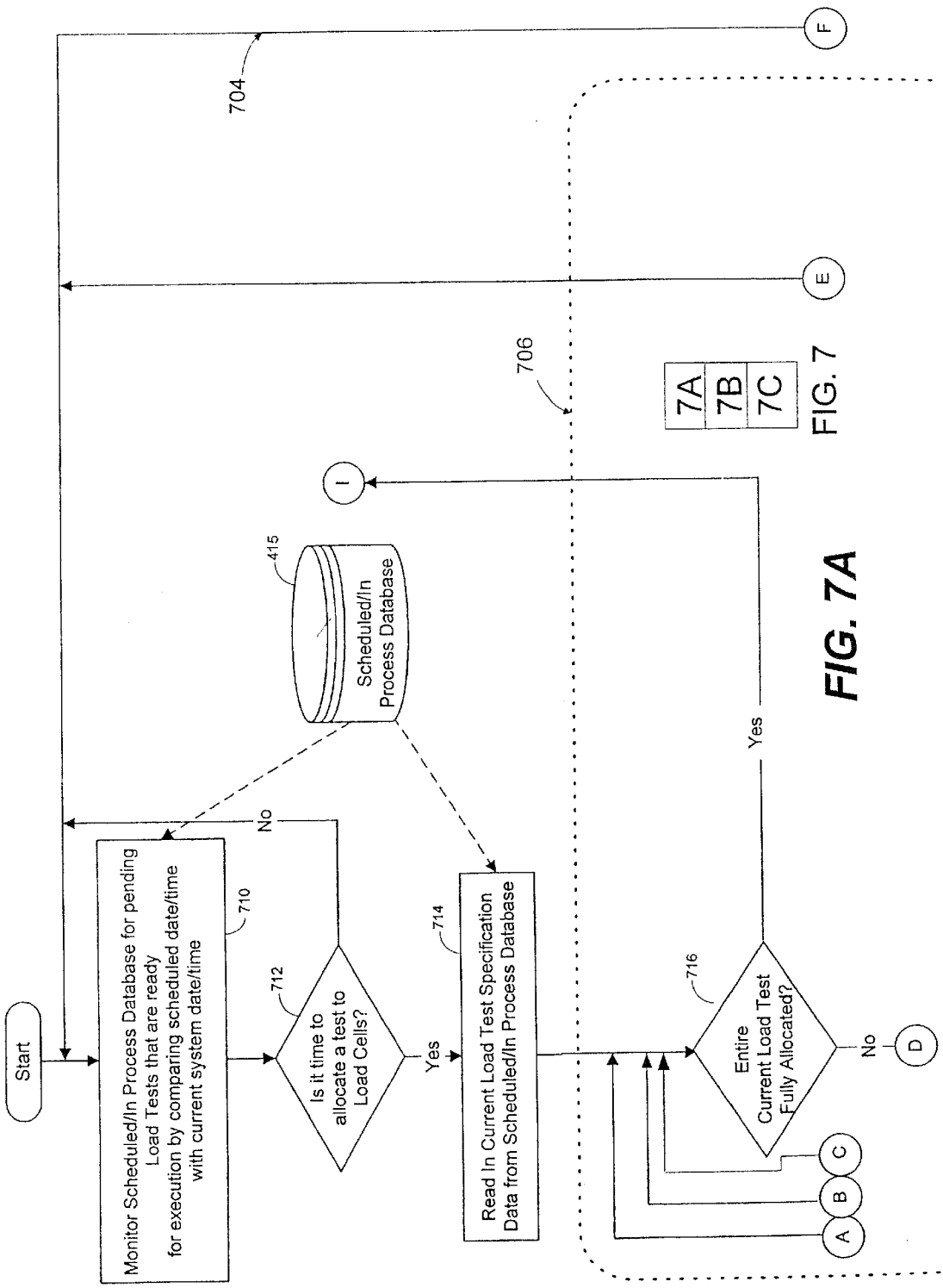
Figure 7B:
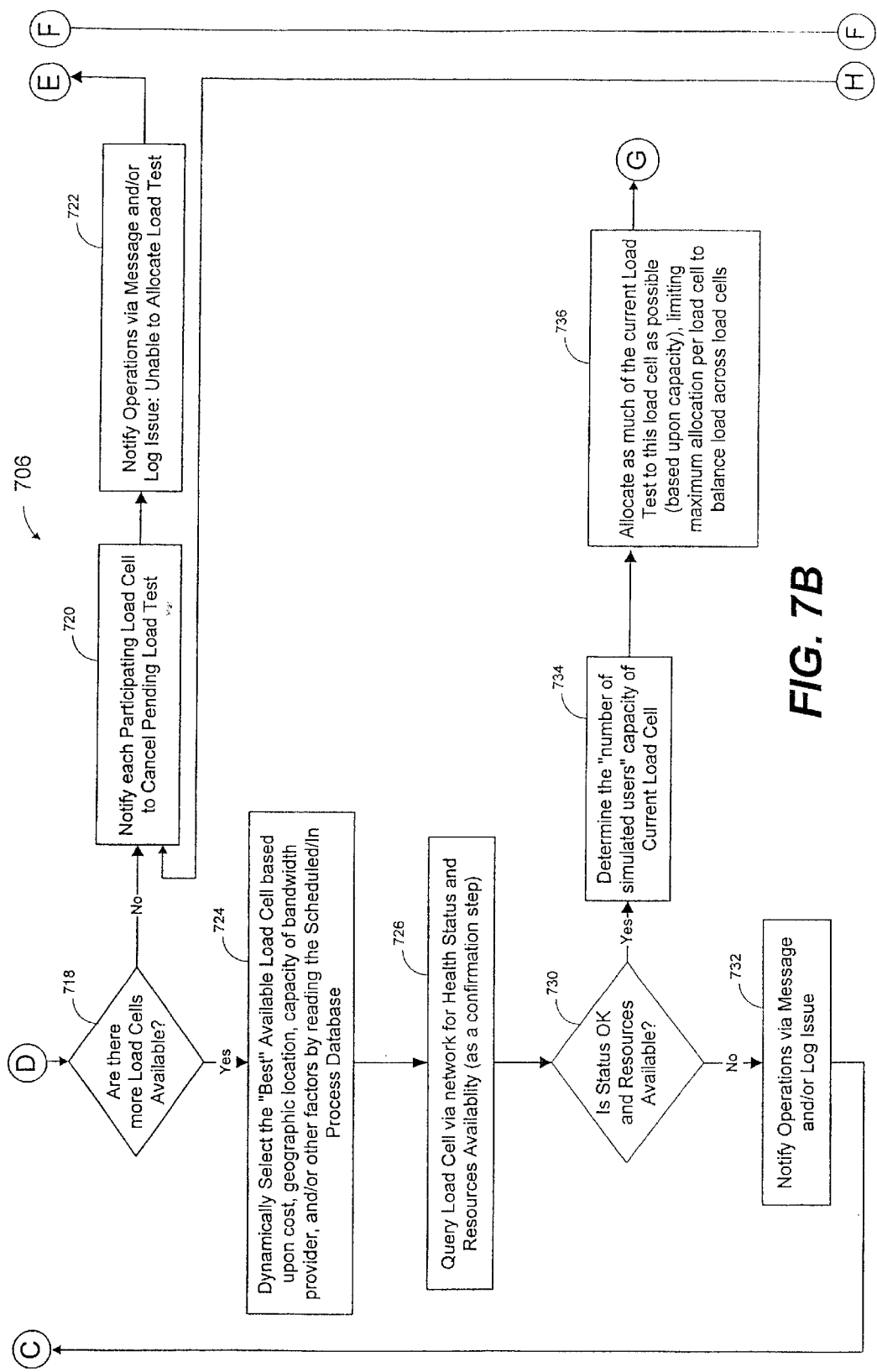
Figure 7C:
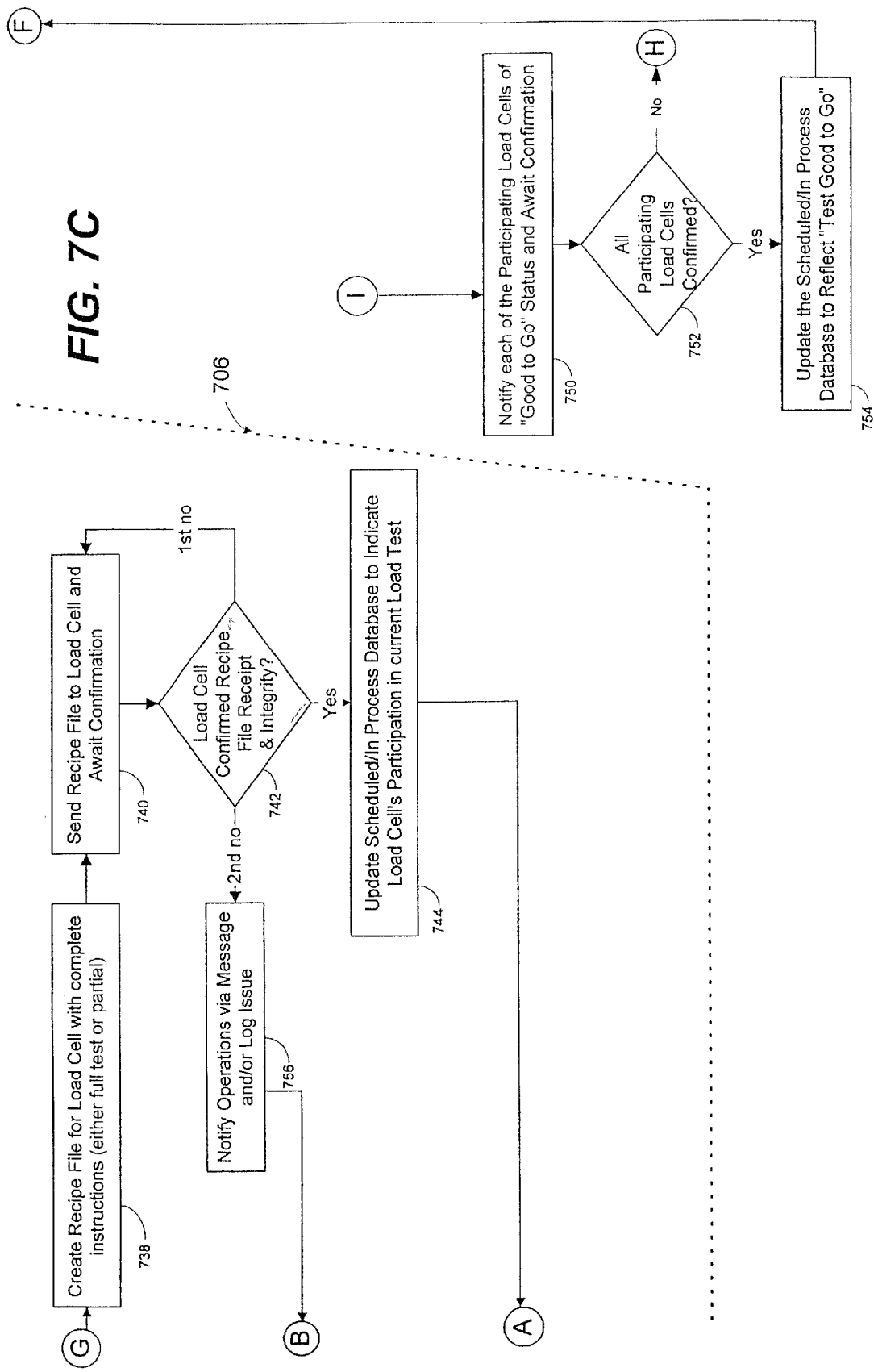

FIGS. 7A, 7B, and 7C are flowcharts illustrating the processing performed in at least one embodiment of a work allocator of a load testing system.

Figure 8A:
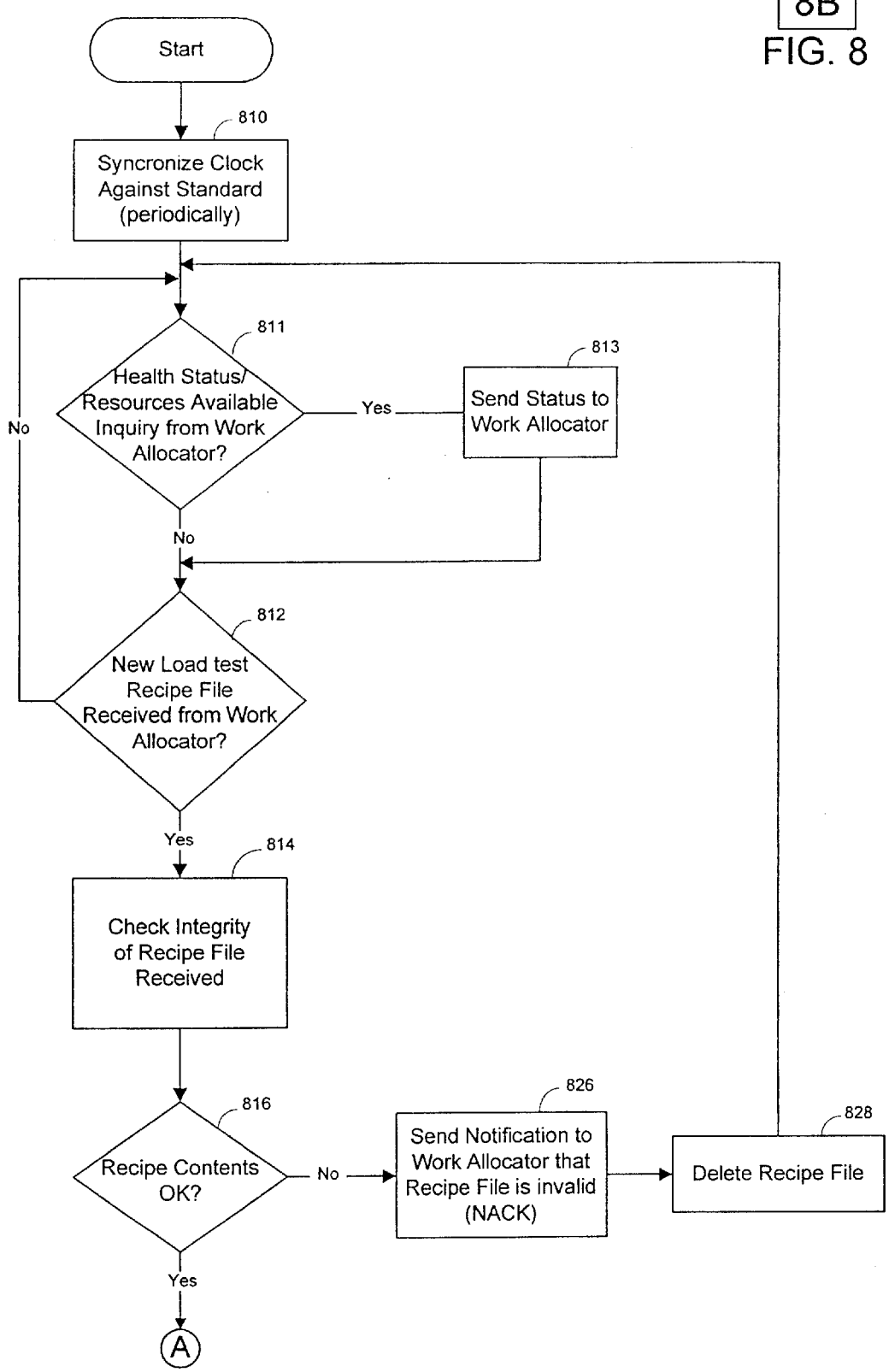
Figure 8B:
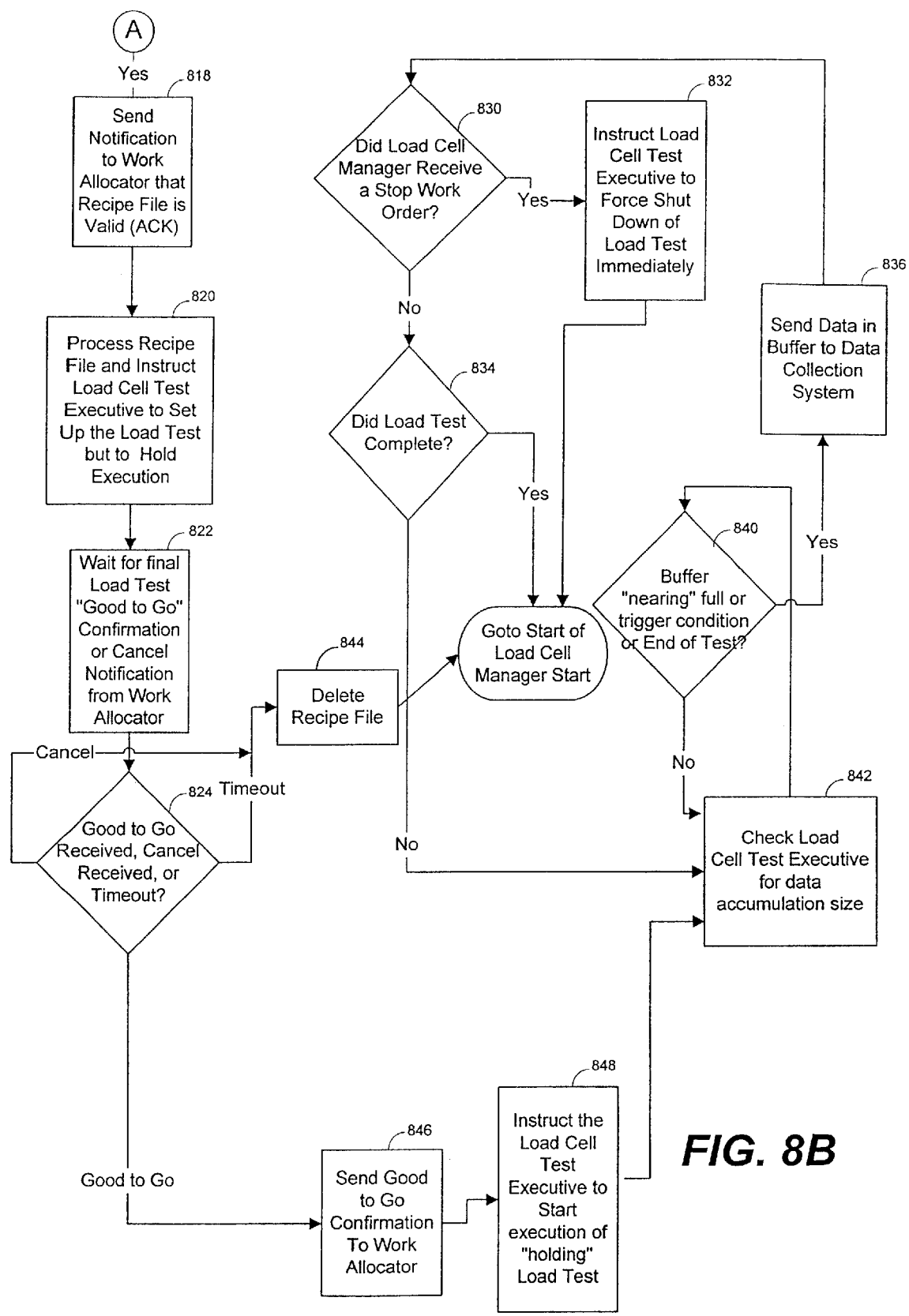

FIGS. 8A and 8B are flowcharts illustrating the processing performed in at least one embodiment of a load cell manager.

Figure 9:
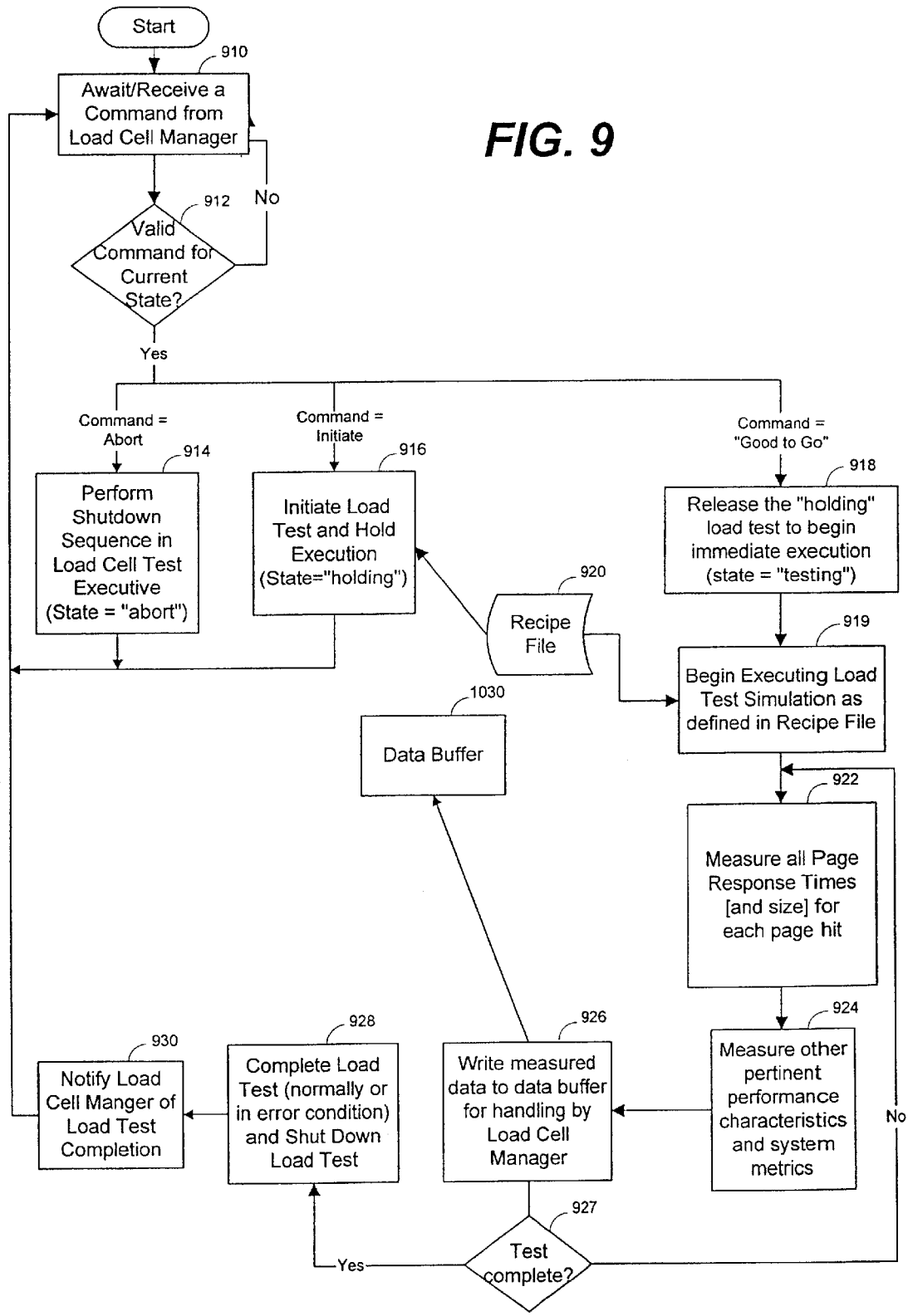

FIG. 9 is a flowchart illustrating the processing performed in at least one embodiment of a load cell test executive.

Figure 10:
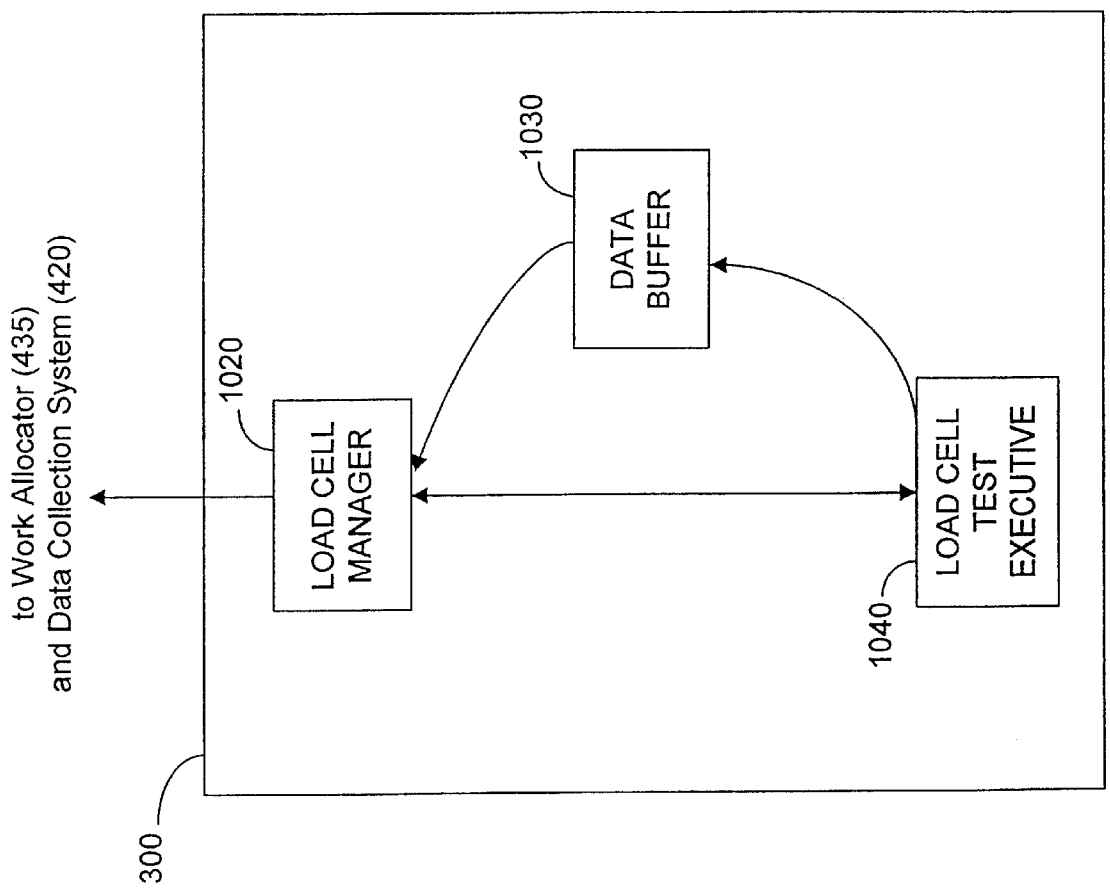

FIG. 10 is a block diagram depicting at least one embodiment of a load cell.

Figure 11:
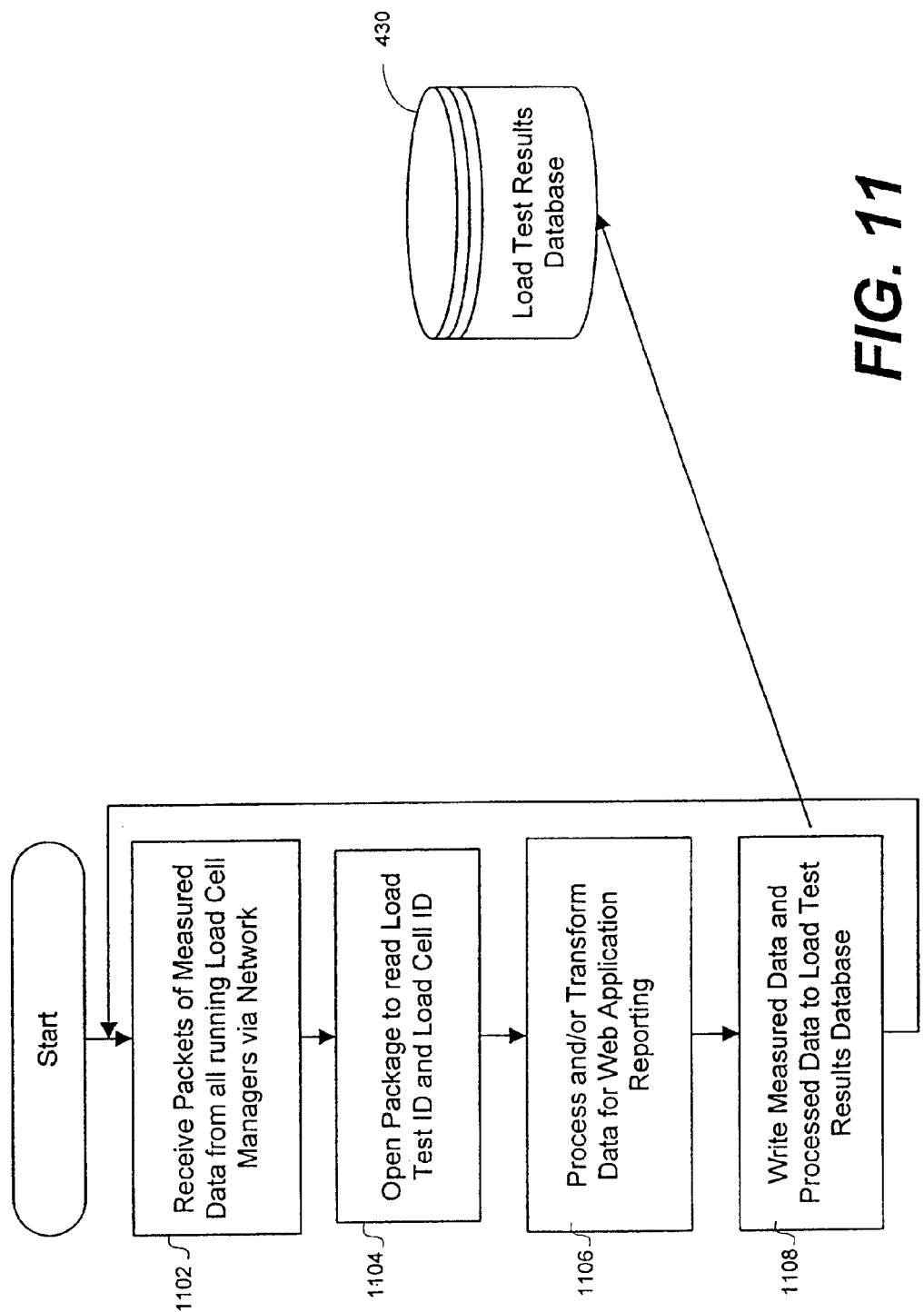

FIG. 11 is a flow chart showing the processing performed in at least one embodiment of a data collection system.

Figure 12:
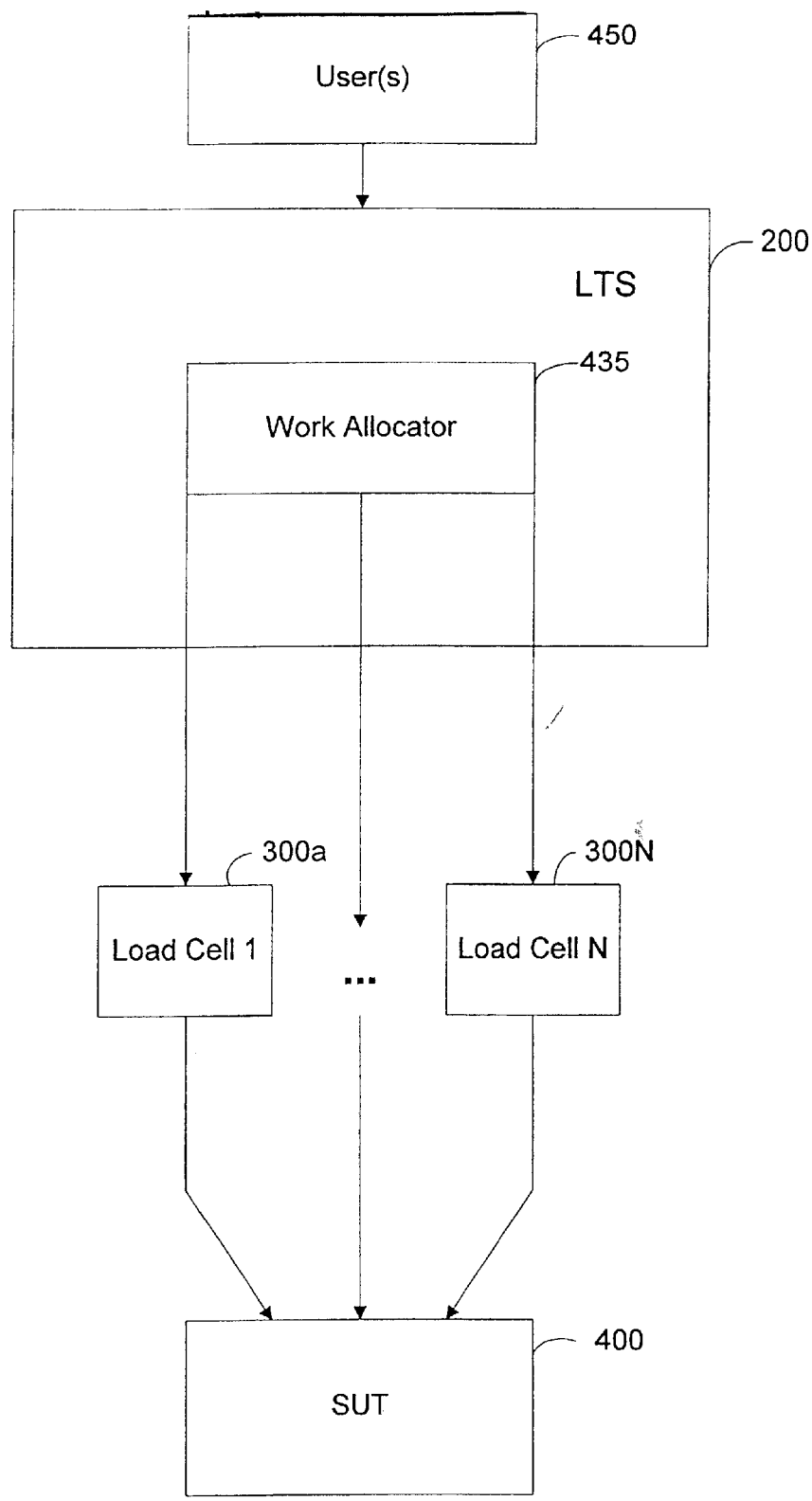

FIG. 12 is a block diagram depicting an embodiment of a load testing system that dynamically allocates one or more load test requests among a plurality of load cells.

Figure 13:
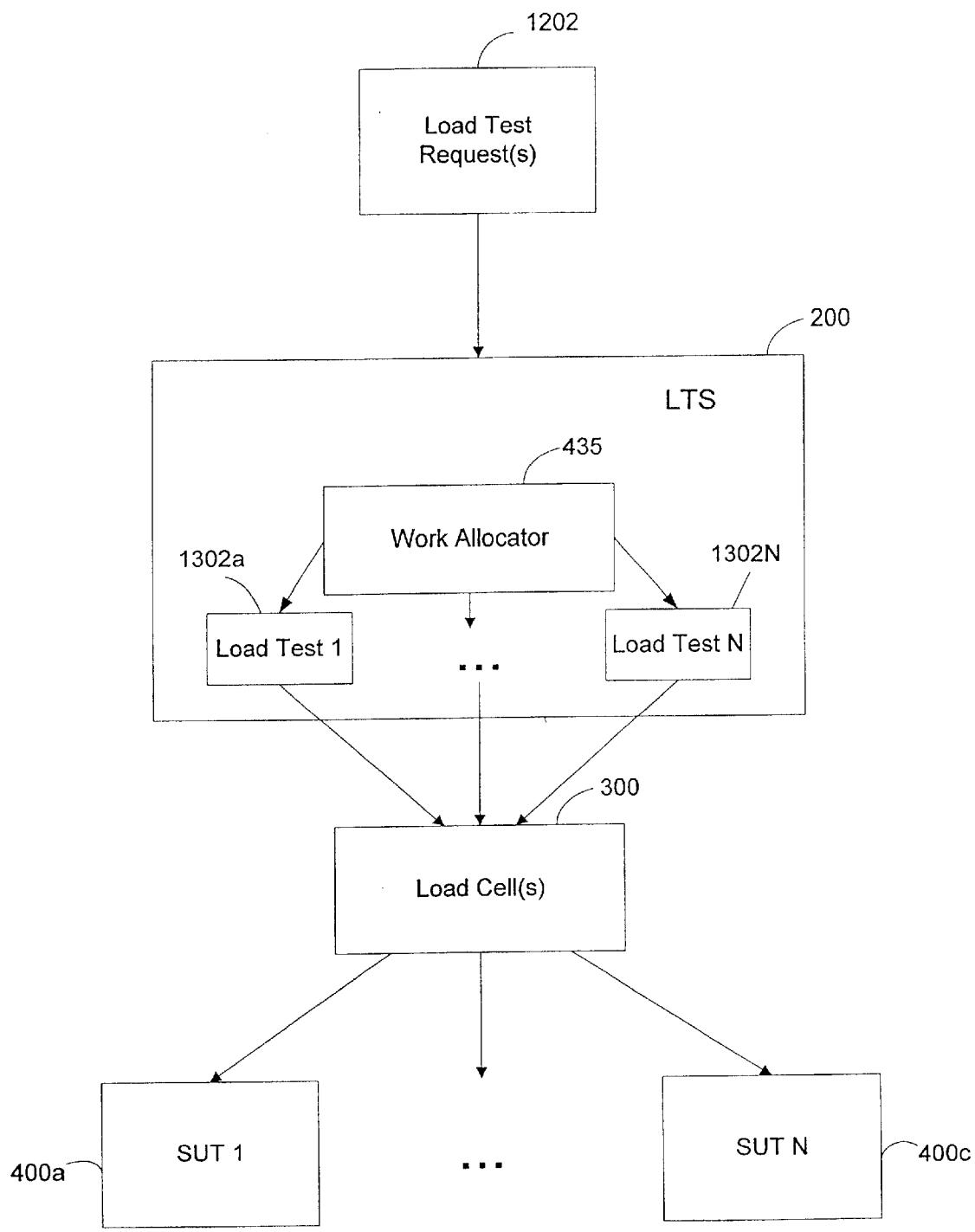

FIG. 13 is a block diagram depicting an embodiment of a load testing system that receives and processes load test requests from one or more users regarding load tests for a plurality of SUTs.

Figure 14:
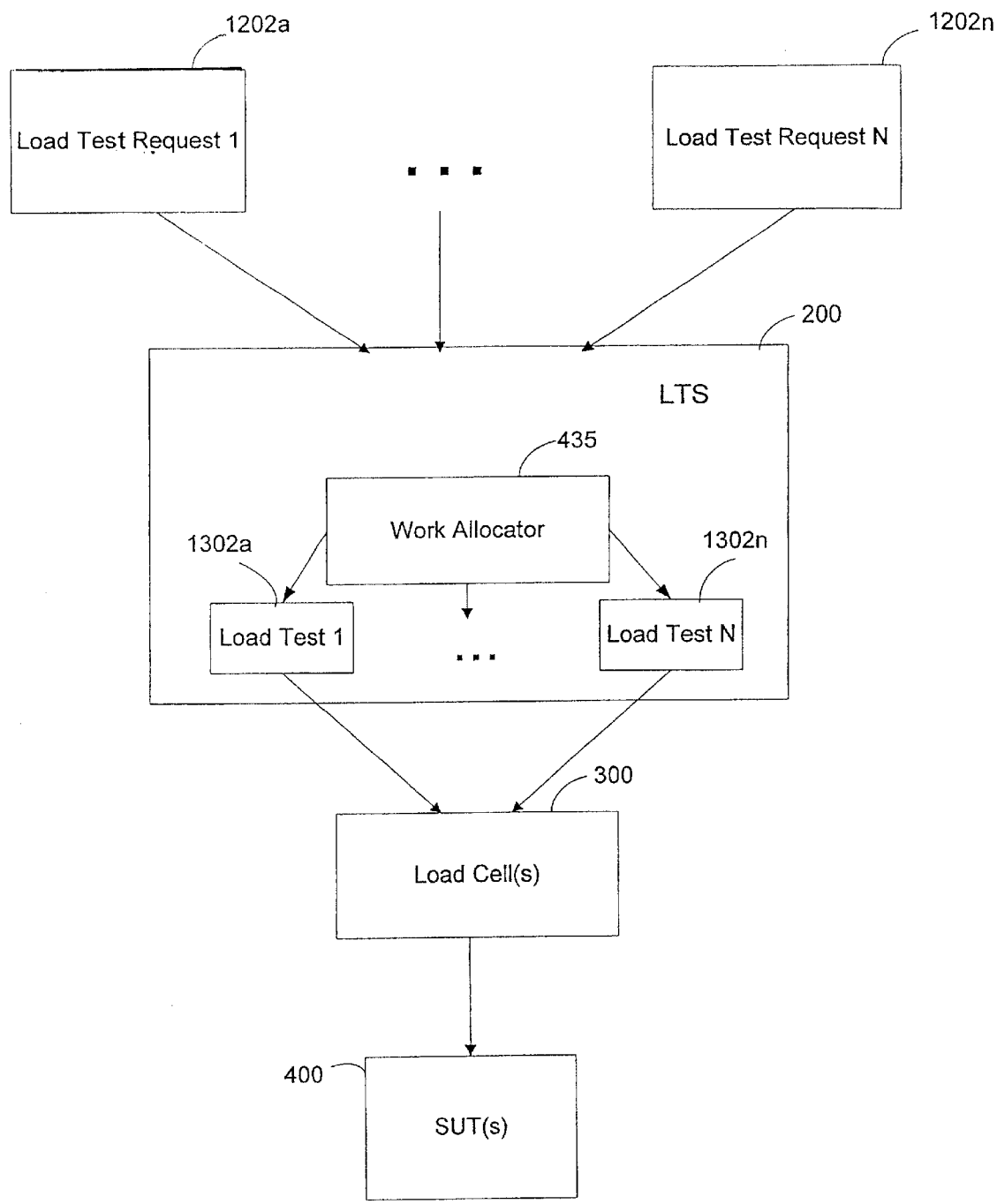

FIG. 14 is a block diagram depicting an embodiment of a load testing system that receives and processes a plurality of concurrently pending load test requests for one or more SUTs.

The use of the same reference symbols in different drawings indicates similar or identical items.

DESCRIPTION OF THE PREFERRED EMBODIMENTS(S)

Load testing of network host systems provides valuable information regarding, for example, the performance, reliability, and/or scalability of the network host systems. A network host system, in one embodiment, includes one or more server computers that are configured to (i) receive data from users via remote client systems, such as personal computers with a modem, (ii) process the data using, for example, application server computers, and (iii) send data in response to accesses from the client systems. The server computers may include database servers. In an Internet network environment, the server computers generally include computers typically referred to as Web servers which provide Web pages to the client systems in accordance with specified protocols such as the hyper text transport protocol ("HTTP"). The Web pages include, for example, data presented in a language recognizable by the client system, such as, hyper text markup language ("HTML") or extended markup language ("XML") and may also include client-side routines, such as JAVA™, which is a trademark of Sun Microsystems, Inc. Client systems connected to the World Wide Web ("Web") typically utilize a Web browser application such as Microsoft Internet Explorer™ software or Netscape Navigator™ software to interpret and display Web pages and interact with the system.

A host system with finite communication and processing capabilities has limits on the number of end users that the host system can concurrently support. End users typically expect a reasonable host system response time on the order of seconds and at most one or two minutes. Additionally, host systems generally expect the number of end users and end user accesses (or "traffic") to increase over time. Knowledge of the maximum number of simultaneous end users for which a host system provides satisfactory performance provides valuable insight and information about the capabilities of the host system and inferences related to user satisfaction. To determine (i) the number of end users that a host system can concurrently support and (ii) the response time that the end users can expect to see from the host system, a load test may be performed on the host system.

Figure 1:
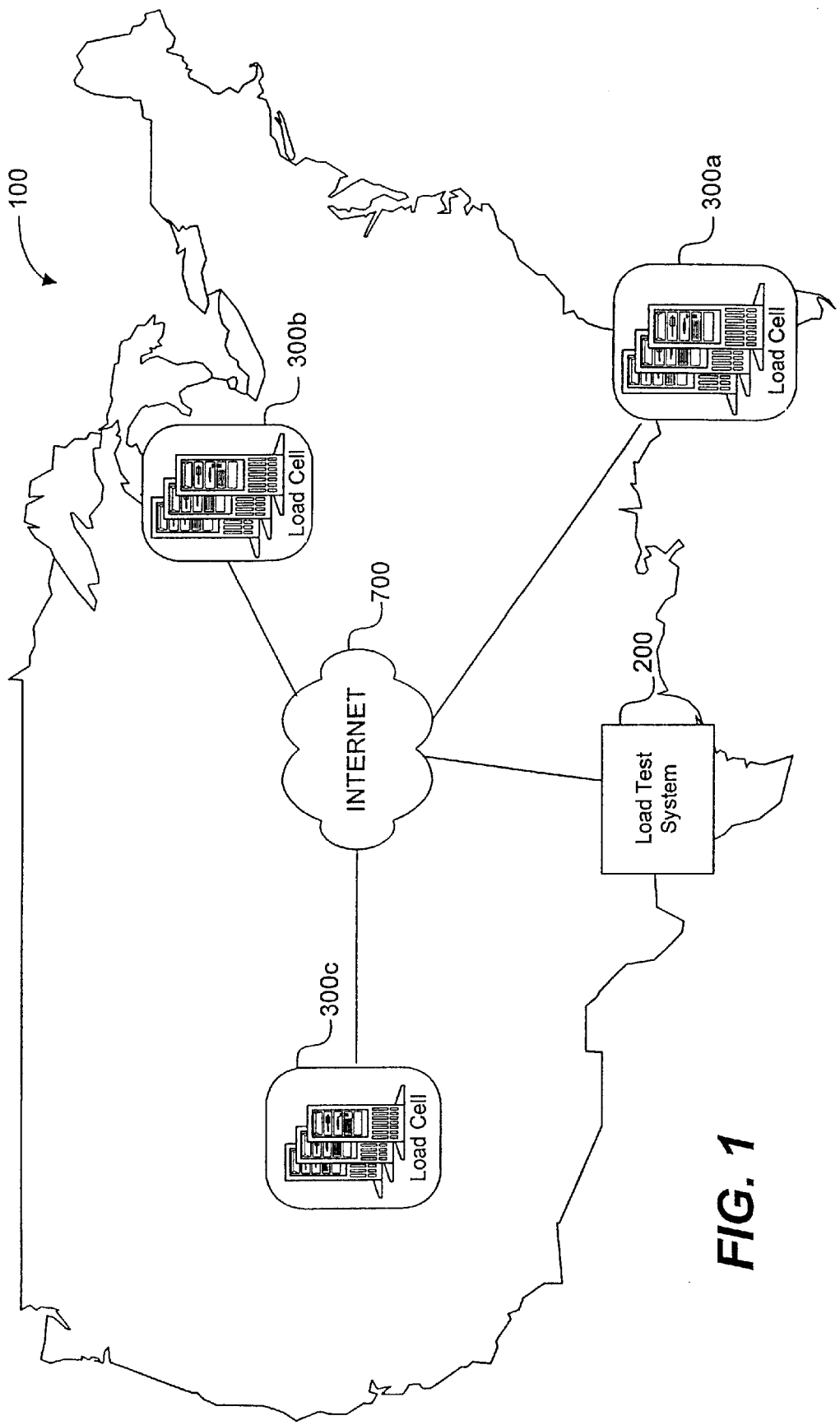
FIG. 1 is a block diagram of one embodiment of a load testing system.

FIG. 1 illustrates one embodiment of load testing network ("LTN") 100 which includes a load testing system ("LTS") 200, electronic interconnectivity via a network 700, such as an intranet or the Internet, and load cells 300, where each load cell includes one or more computer processors coupled to a data storage device(s) configured to support the processes set forth herein. Three load cells, load cells 300a, 300b, and 300c (referred to collectively as load cells 300) are shown in FIG. 1, but LTN 100 can include N different load cells, depending upon the number load cells used by LTN 100, including any backup load cells, to support load testing. The different load cells are shown in FIG. 1 to be physically distinct computer processing systems that each contain one or more processors. In an alternative embodiment, a plurality of load cells may be implemented by a single physical computer processing system which is logically partitioned into more than one load cell 300.

LTN 100 preferably employs hardware and software and available access to Internet 700 via one or more private networks, publicly switched networks, T1 trunks, OC3 trunks, ADSL/SDSL trunks, or via other communication means which support sufficient high speed access to the Internet to accommodate the number of simultaneous end users being simulated by a load test. Multi-sourced groups or "banks" of these communications means may be used to avoid overloading any one particular provider of network access ("bandwidth provider"). The network 700 may be the Internet or any other large area network ("LAN"), wide area network ("WAN"), or other network capable of interconnecting LTN 100 resources. As shown in FIG. 1, LTS 200 and the plurality of load cells 300 are electronically interconnected by network 700. In another environment LTN 100 may be interconnected using wireless means or a combination of wireless and land line means.

Figure 2:
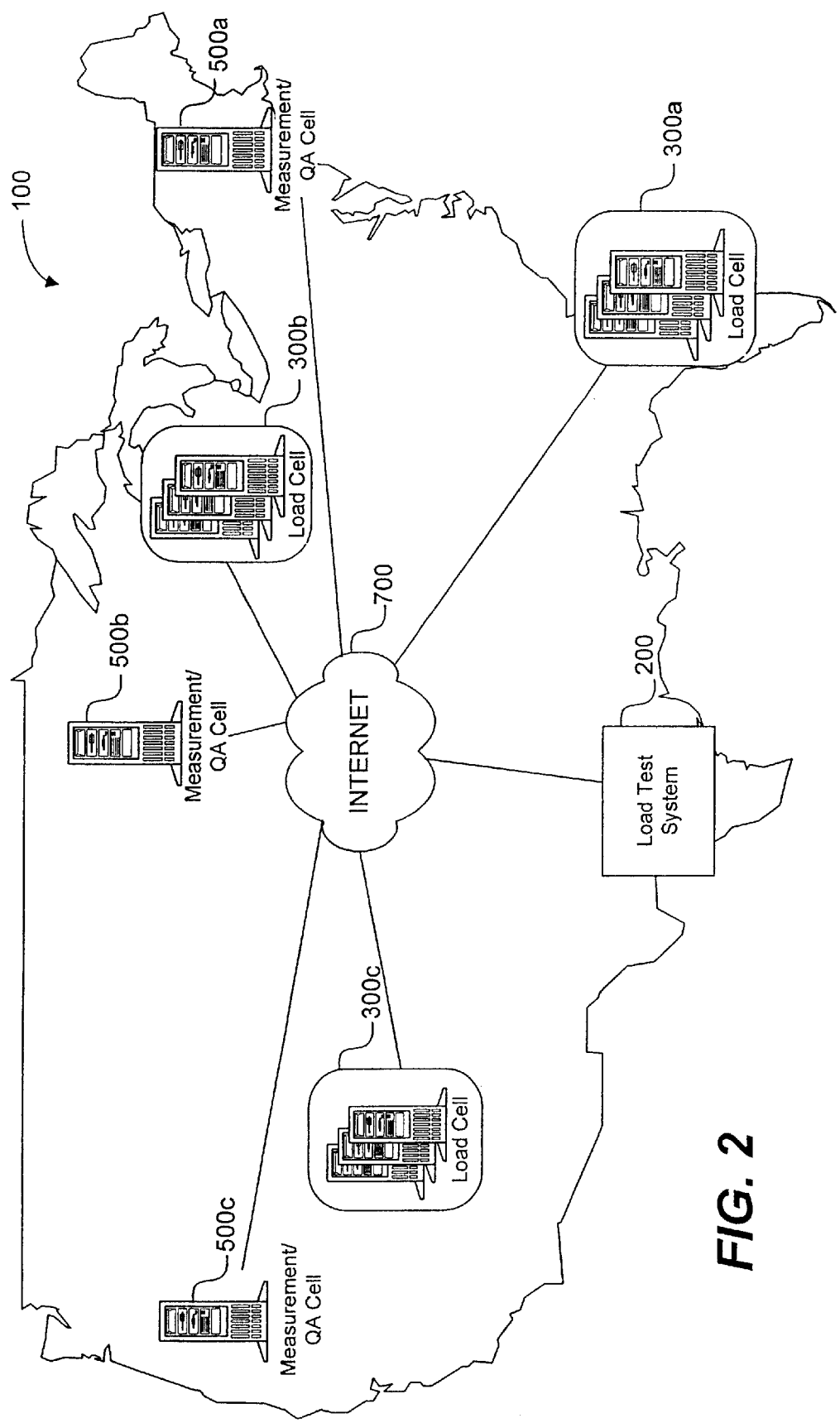
FIG. 2 is a block diagram illustrating one embodiment of a load testing system that includes load cells and measurement/QA cells.

FIG. 2 illustrates that LTN 100, in one embodiment, also includes measurement/QA cells 500a, 500b, and 500c (referred to collectively as measurement/QA cells 500). Measurement/QA cells 500 and associated functionality are discussed in more detail below.

Figure 3:
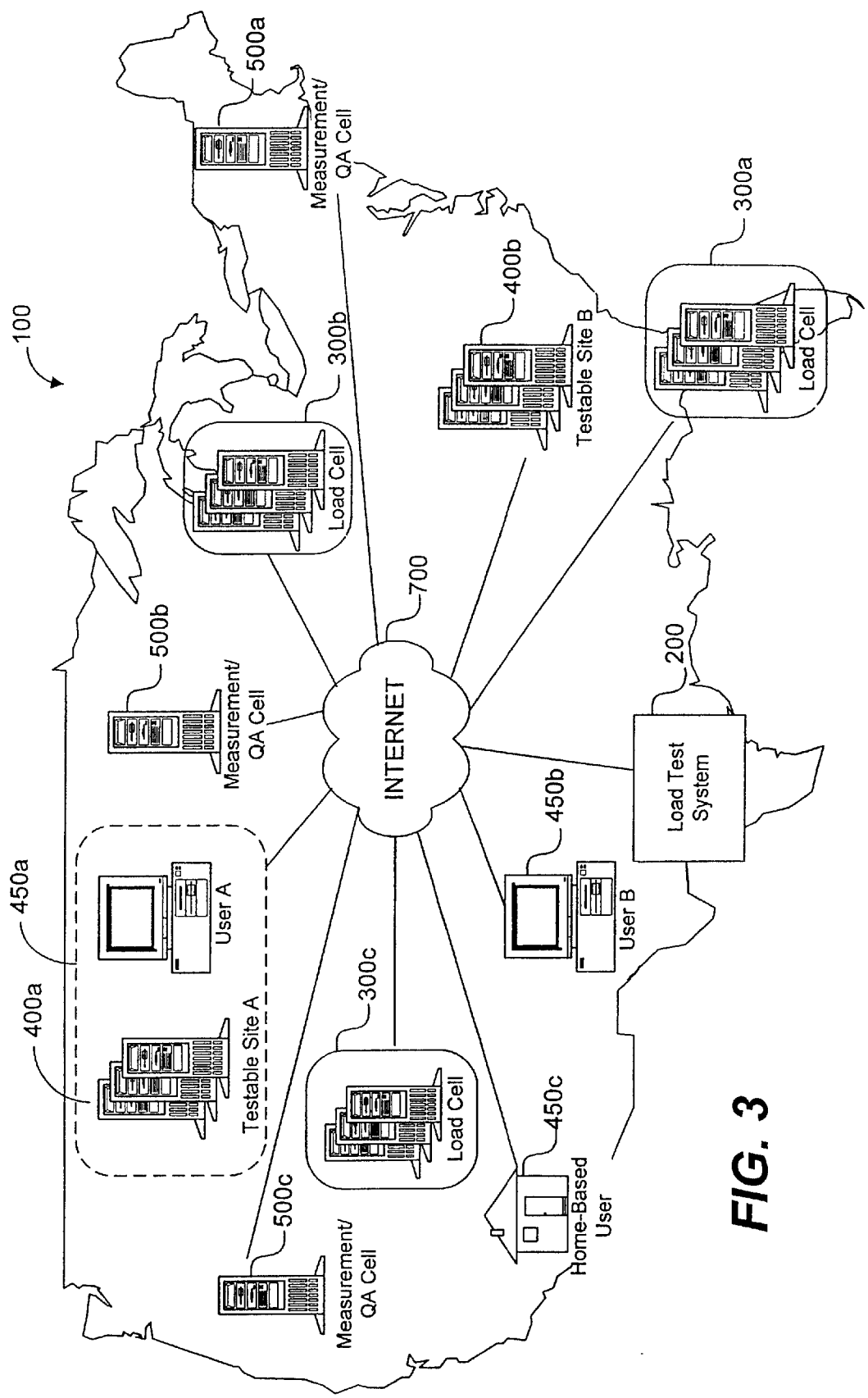
FIG. 3 is a block diagram illustrating the connection of multiple network users with one embodiment of the load testing system.

FIG. 3 illustrates that LTN 100 also includes, in at least one embodiment, additional computers that make up Testable Sites 400a and 400b (referred to collectively as Testable Sites 400). Each Testable Site 400 includes one or more data processing systems that make up the host system for a particular User of LTN 100, where each data processing system of the Testable Site 400 is coupled to a network such as Internet 700.

An embodiment of load test system 200 electronically interacts, via the Internet 700, with a plurality of users ("Users"), such as Users A and B and Home-Based User through their respective computer systems 450a, 450b, and 450c. The number of Users and load requests in LTN 100 which can be supported by LTS 200 is essentially limited only by the simulation capacity of the load cells 300 and network bandwidth. Unless specifically noted otherwise herein, all communications with Users occurs via their respective computer systems coupled to LTS 200. Users A and B and Home-based User, and their respective computer systems 450a, 450b, 450c, are collectively referred to herein as User 450.

The LTN 100 of FIG. 3, in at least one embodiment, provides a nonintrusive solution to Testable Site 400 load testing in that such embodiment of LTN 200 does not require modification, such as installing and executing load-testing-specific routines, of a Testable Site 400 subjected to load testing. An alternative embodiment provides for installation of load-testing-specific software, such as script capture software, at the Testable Site 400. In an HTTP, HTML network environment, Users of LTS 200 can operate and control LTS 200 from any HTTP, HTML-enabled Internet browser without installing additional software on the user's client system. As browsers, mark-up languages, and protocols change, the LTS 200 may be easily modified by one of ordinary skill in the art to support such changes. In at least one embodiment, Users access LTS 200 via their client system to select the characteristics of a particular load test. The LTS 200 does not require modifications to the user's client system provided the client system can communicate with LTS 200, otherwise communication means should by installed on the client system to facilitate standard Internet communications. Thus, implementation costs may be reduced and rapid deployment may be realized.

In at least one embodiment of LTN 100, LTN 100 performs load testing of multiple Testable Sites 400a, 400b in any known language in accordance with respective User selections by coordinating allocation of LTN 100 resources in accordance with respective demands of the User's selections.

Returning to FIG. 3, LTN 100 provides resources configured to permit one or more Users to simultaneously share LTS 200. As explained in more detail below, in one embodiment, Users access LTS 200 via a Web site. The LTS 200 Web site is developed using Internet development tools well known in the art, and interaction between LTS 200 and Users can be achieved via the exchange of information using Web pages. The information obtained from such Users provides a basis for creating one or more load test requests and for LTN 100 to coordinate usage of load cells 300 and other LTN 100 resources for load testing of Testable Sites 400. By entering basic end user and load test parametric information at the portal site, the User can, in effect, generate specific levels of simulated user traffic that can be focused directly at each User's designated Testable Site 400, referred to herein as the site under test ("SUT").

LTS 200 may concurrently process load test requests from one or more Users 450 regarding one or more SUTs 400. Due to the availability of a network such as Internet 700, Users requesting the load testing services of the LTN 100 may (i) be located in the same geographic location as the SUT, such as User A 450a and Testable Site A 400a or (ii) alternatively receive a load test request from a User that is geographically remote from the location where the SUT 400 is hosted. For example, User B 450b or Home Based User 450c may request a load test for Testable Site B 400b which is geographically remote from both User B and Home Based User. Thus, in one embodiment, establishing communication between LTS 200, User systems 450, and SUTs 400 via a network, makes LTS 200's load testing services' accessibility limited only by the extent of such network. The essentially continuous availability of the Internet 700 is advantageous since such load tests must often be initiated and stopped during all hours of the day or night and because most of today's Web sites are hosted by remote third-party service providers.

By interacting with the LTS 200 over the Internet 700 or other network as described in more detail below, Users of the LTN 100 may perform the following example load test transactions:

1. Account Setup (secure User login/authentication, organization/account management, access control and payment transaction management),
2. Build and save simulated user scripts and scenarios using, for example, an automated, remote capture tool,
3. Setup, schedule, and execute load tests, and
4. Review and analyze test results (both real-time and post-test results).

LTN 100 may be configured to perform more, less, or different load-test-related transactions as desired. Note: the term "real-time" includes transmission and processing latencies.

Figure 4:
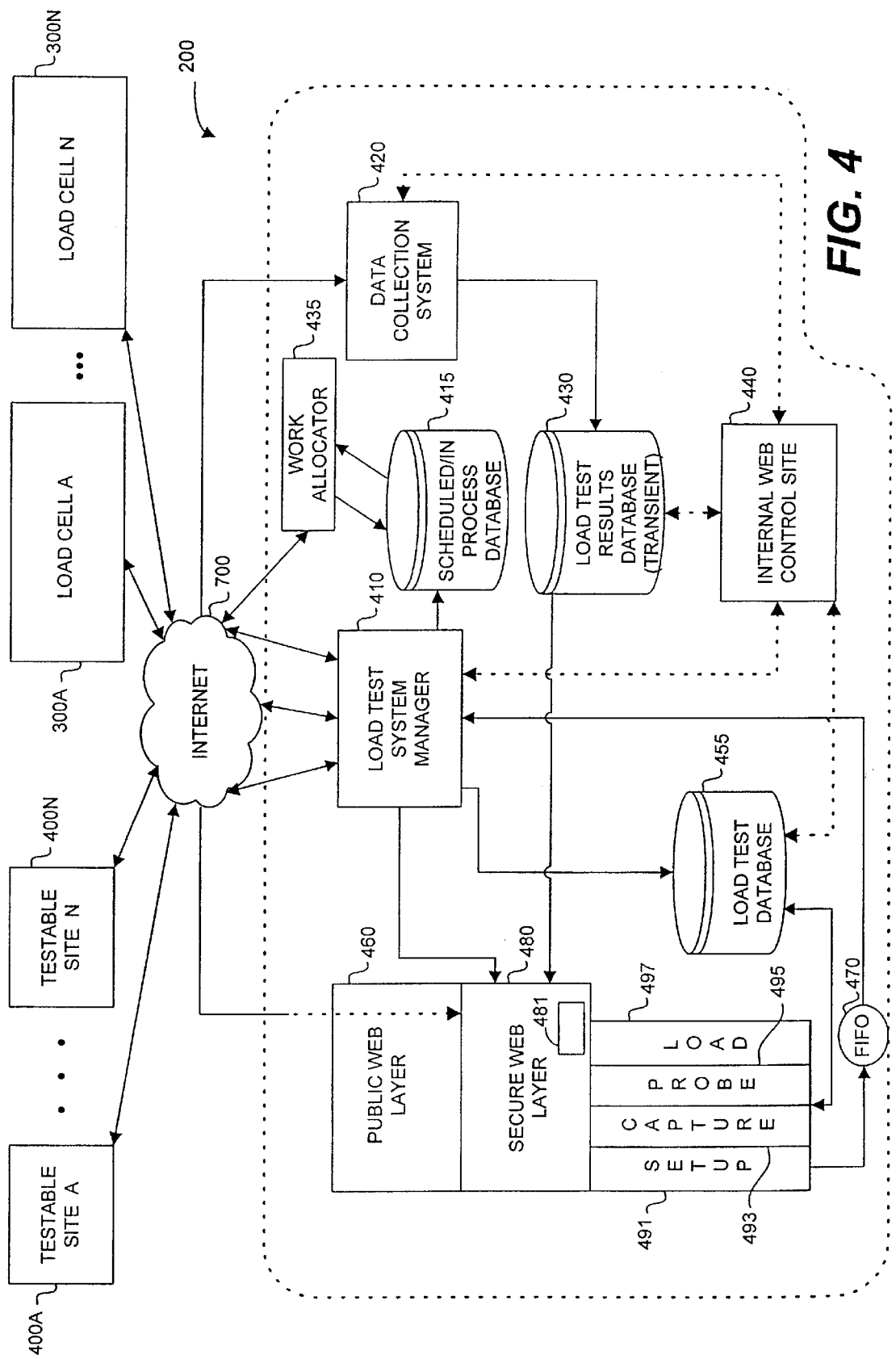
FIG. 4 is a block diagram of one embodiment of a portal Web site for a load testing system.

FIG. 4 illustrates that LTS 200 includes a public Web layer 460 which provides information to the User concerning the types of load testing services available through the LTN 100 and other information regarding the LTN 100, such as access-oriented information regarding account set-up and terms of use. In addition to providing such information, public web layer 460 generates Account Setup transaction pages that allow new Users to set up an account and begin using the LTS 200 by submitting User-specific information such as a login name (such as their email address) and billing information, such as a credit card number. Using the User-specific information, LTS 200 assigns each User a unique identifier.

Referring again to FIG. 3, LTS 200 includes several basic functional subsystems to (i) receive communications from Users and (ii) process these communications. In one embodiment, the subsystems may be implemented in software, stored in memory, and executed by a computer having a processor. In an Internet environment, each subsystem that interacts with a User does so by causing Web pages to be generated and transmitted to data processing systems of accessing Users 450 via the Internet 700.

The public Web layer 460 of LTS 200 provides a log-in page so that existing Users may access the secure Web layer 480 using their unique User identifier, User name, and password. The login page preferably operates in coordination with a security firewall to provide selective access to the secure Web layer 480 of LTN 100. The security firewall (not pictured) uses security measures, such as encryption over a secure sockets layer (SSL), to allow only authorized Users with proper identification transmissions to access secure Web layer 480. These security measures are used to create a virtual private network (VPN) between authorized Users and the secure Web layer 480.

Through the secure Web layer 480, the User can initiate new load tests and review results from in-progress and any completed load tests. To initiate a new load test, the User provides information as requested by LTN 100 through Web page prompts to generate a load test request. The information contained in the load test request varies depending on the type of load test the User wishes to initiate. LTN 100 can be configured to support any number of User selected loading parameters and response metrics. Based on the information in the load test request, LTN 100 performs one or more load tests for the one or more SUTs selected by each User as illustratively described below.

Referring to FIG. 3 and FIG. 5A, one or more Users may simultaneously utilize LTS 200 to generate load test requests. FIG. 5A illustrates that N different Users may use LTS 200 to submit load test requests to LTS 200 and thus each initiate a User-directed load test, where in FIG. 3 N equals three. The operations 502a through 514n are processed in parallel for Users a through N, respectively. For conciseness, this description describes one path for one User, which is the same path for all Users and generation of all load tests. To initiate a User-directed load test using LTS 200, the User accesses LTS 200 using the User's own Internet 700 service provider and own equipment. Each User can directly access LTS 200 using a Web browser application such as Netscape Navigator™ or Microsoft Internet Explorer™.

Figure 5B:
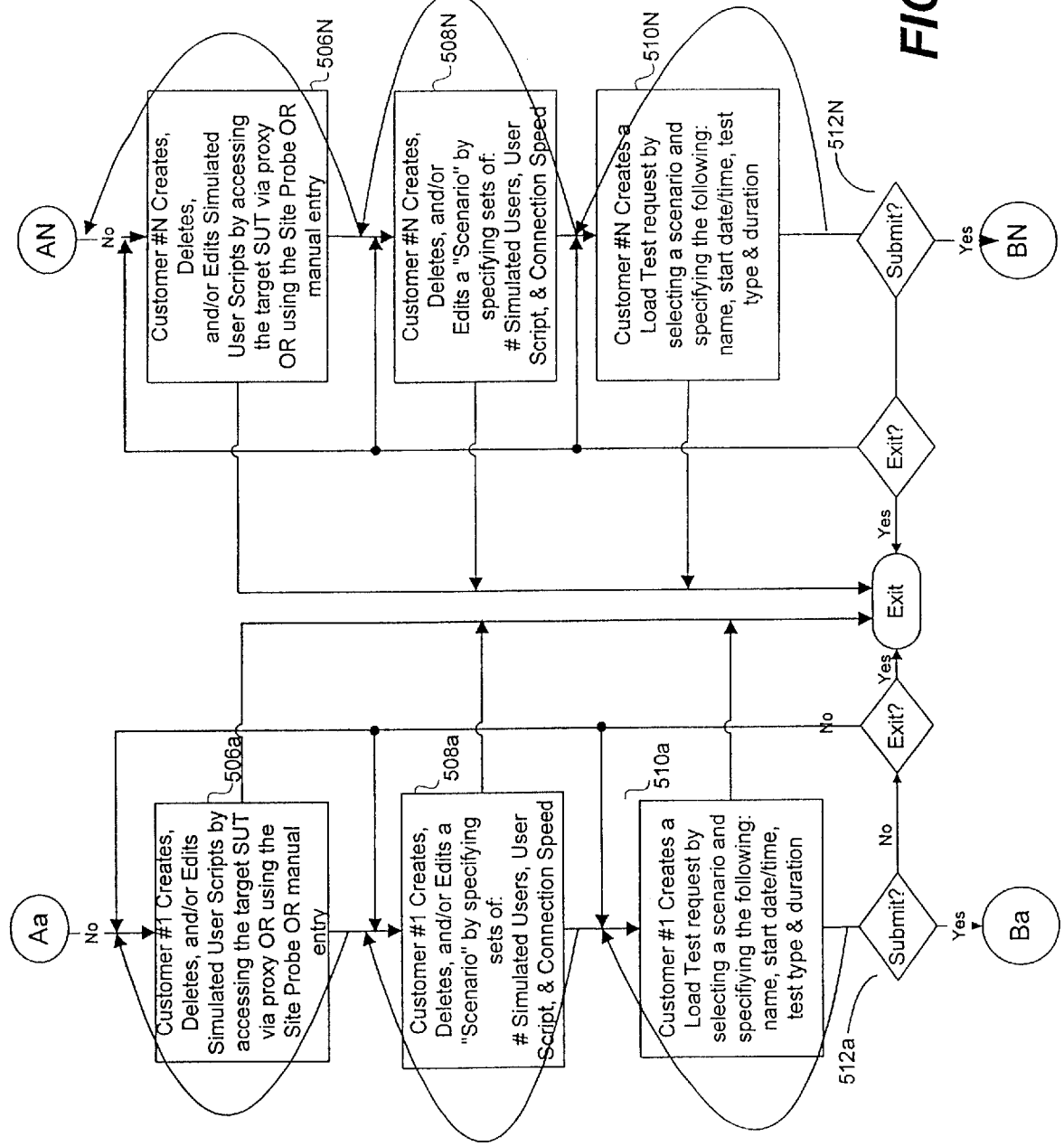

FIGS. 5A and 5B are block diagrams illustrating User initiations of a load test from the secure Web layer 480. "N" parallel User processing paths of User operations 502a–514a through 502n–514n are shown to depict that LTS 200 supports N simultaneous User operations 502–514. To gain access to the secure Web layer 480, a User first accesses the public Web layer 460 in operation 502. Users 1 through N ("1:N") may simultaneously access the public Web layer 460.

In operation 504, the User logs into secure Web layer 480. From the secure Web layer 480, the User may access a setup subsystem 491 of the secure Web layer 480 to set up new load test requests. Multiple load test types are available in one embodiment. Each load test request typically specifies the load test type to be applied to the SUT during testing as described below, or, alternatively, a default load type may be selected, or only a single load type may be available. Each load test may include a simulated user "script". A "simulated user" represents an actual end user who accesses the SUT.

Referring to FIG. 5B, in operation 506 the User creates simulated user scripts that are used during load testing as part of a load test. The setup subsystem 491 also allows Users to edit or delete any previously-created simulated user scripts in operation 506 for as long as such scripts are saved by LTS 200. In this context, the word "scripts" is used in a broad sense and refers to any type of a specific sequence of actions in a format that can be understood and re-enacted by a computer system loaded with the appropriate software. Each script simulates an actual user's session with a SUT. They may be recorded in a traditional "script" language such as job control language ("JCL"), structured query language ("SQL"), Microsoft's Active Script™, or a custom language. They may be recorded as a machine-readable series of commands, such as a compiled, executable ".exe" file representing a series of machine-readable commands written in any programming language, such C++. Or, they may be recorded in any other manner that allows load cells 300 to reenact the actions recorded in the scripts to simulate a session with a SUT.

The creation of scripts in operation 506 may be accomplished in any of several manners. One manner is for the User to manually enter a series of simulated user actions to generate a script. Another manner is for the User to access the SUT and capture in a script the series of actions the User takes when interacting with the SUT. The actions may be captured, in one embodiment, with a software application that is installed on the SUT hardware server. In another embodiment, the actions may be captured with a non-intrusive proxy capture (NPC) tool. In another manner of creating scripts, the scripts are not generated by the User at all, but the User instead indicates that the LTN 100 should generate a sequence, which may be random or ordered, of simulated user actions.

To edit a previously-created and saved script when the User 450 has accessed the setup subsystem 491, the LTN 100 displays to the User a complete list of previously-requested load tests, including a unique name for each load test as well as a description of the load test and the date and time the load test was created and the duration of the load test. Any of the existing scripts may be deleted or edited When simulating a session with a SUT to create a script, it is the User's goal, in at least one embodiment, to simulate the behavior that the User expects to see from actual users when they access the SUT. A User of the LTN 100 may have identified different types of behavior that are exhibited by different types of users when they access the SUT. For instance, one type of user might browse the SUT to gather information, such as a user who browses an on-line catalog. Another type of user might search the SUT for information regarding a particular product. Another type of user might, for instance, order products or services through an e-commerce component of the SUT. Finally, the User may have identified a user type that uses the SUT to access an on-line customer service feature. For each type of user, the User can create a specific script that emulates the behavior that the User expects to see from that type of user. In the above example, the script that emulates an end user browsing an on-line catalog may be created with the identifying label of BrowsingCatalog. The other scripts in the above example, may be created with identifying labels, respectively, of ProductSearching, ActiveBuyers, and CustomerService.

Referring to FIG. 4, the secure Web layer 480 provides a capture interface 493 and a Web site probe interface 495 to accelerate and simplify the creation of scripts. Both the capture interface 493 and the probe interface 495 allow the User to simulate a session with a SUT to create a simulated user script. The capture interface 493 allows the User to initiate a series of communications between the User and the SUT, which the capture interface 493 captures and records as a script. The probe interface 495 automatically generates a site map of the SUT, which can be utilized by the LTN 100 to randomly load the SUT.

In at least one embodiment, the capture interface 493 provides an NPC tool that automatically captures simulated user sessions and, catalogues and manages simulated user scripts. NPC is an on-line tool hosted at the secure Web site 380 which the LTN 100 will use for selected SUT(s) for playback during load testing. To capture the simulated session, in one embodiment, the NPC automatically captures time-sequenced HTTP services and creates a script of the captured services that may be used as the simulated user sessions for load tests. In one embodiment, the simulated user scenarios are captured nonintrusively, i.e., without, for example, causing the SUT to execute new code and without modifying the User's code.

In conjunction with the capture interface 493, or as an alternative to the capture interface 493, a User may choose to use the automated Web site probe interface 495, which navigates through pages of SUT. In one embodiment, the probe interface 495 utilizes a Web spider, a technology well known in the art. The User provides the starting target uniform resource locator (URL) of the SUT to the LTN 100, and the probe interface 495 first retrieves the target or root page of the SUT. The probe interface 495 then generates a site map of the SUT by probing the SUT for static Web pages, which it does by retrieving each Web page referenced by a hyperlink on the root Web page. Each of these pages becomes a new root, and the whole process is repeated for a given number of iterations or until no "child" Web pages, Web pages linked directly to a root page, exist. This process produces a complete SUT site map or tree suitable for navigating the entire SUT. The tree consists of valid hyperlinks to the static pages of the SUT.

During the site probe interface 495 function, the User may either stop or abort the SUT probe at any time. After the probe is complete, the User may view a site map page that provides an expanded site map of the SUT, including, for example, information associated with the site map such as the tree structure of the SUT along with page name, page size, page type, and page weighting factor.

Scripts may also be created in operation 506 through the use of server log files. In at least one embodiment, scripts are created using log files that log the user traffic at a particular site. Software on the server logs this traffic, and these server-side logs are used as the base source for a script that emulates the user traffic recorded in the log.

Returning to FIG. 5B, the creation of scripts in operation 506 may be performed iteratively, so that a User may create as many different simulated user scripts as desired. After creating one or more simulated user scripts, a User of the LTN 100 can create user "scenarios" to be used by LTN 100 when it performs load testing. In this operation 508, the User creates the scenario by selecting the script to be performed, along with the number of simulated users that are to perform each script during load testing, as well as the connection speed that is to be simulated for the simulated users for each script during the load test. FIG. 5B indicates that operation 508 may be performed iteratively, if the User desires. Any number of test scenarios can be built once and reused repeatedly. To facilitate re-use, the LTN 100 assigns each scenario a unique identifier.

When a scenario is created (built), different user scripts can be used to emulate different user groups with their own unique user characteristics. For example, a 1,000-simultaneous-user scenario may be composed of four different scripts such as: 500 users BrowsingCatalog, 200 users ProductSearching, 200 users ActiveBuyers, and 100 users CustomerService. Each component of a "scenario" includes a script and the specified parameters, such as bandwidth, that the User expects to see for each user group.

FIGS. 4 and 5B illustrate that the information presented to the secure Web layer 480 by the User in operations 506 and 508 is stored, according to at least one embodiment, in the load test database 455. The load test database 455 stores, among other things, User login information, captured scripts, scenarios, and security information. By saving scripts and scenarios, the LTN 100 allows the User to re-use the information instead of re-creating it for each load test, thus saving the User time in the future. This feature of the LTN 100 also saves the User time by allowing the User to create new scripts by editing existing scripts, rather than creating new scripts wholesale.

Returning to FIG. 5B, the User builds a load test request in operation 510. The load test request indicates a name for the load test, the SUT address for the test, a start date and start time for the test, a duration for the test, a simulated user multiplier (for Type 1 load tests, as described below) or target average response time in seconds (for Type 2 load tests), and the user scenario to be performed.

In creating a load test request, the User also indicates in operation 510 the type of load test to be performed. In a first type of load test, a Type 1 test, the User specifies a specific number of users to be simulated in the loading of the SUT via the scenario user count multiplied by the user count multiplier. In a second type of load test, a Type 2 test, the User specifies a target average response time. During a Type 2 test, the LTN 100 applies increasing proportionate load (as set forth in the scenario user count) to the SUT in order to produce the target response time. This allows the User to determine how many users its SUT can support while still providing the desired response time.

In addition to the Type 1 and Type 2 load tests described above, where the User indicates one or more scenarios to be performed, the User has the option to select a third type of load test request called the "one-click load test". The one-click load test utilizes probe interface 495 to generate an SUT tree as described above. The probe interface 495 then probes the site of the SUT for static pages and produces a tree as described above. The LTN 100 then automatically provides a random load against the SUT by accessing and receiving responses from the static pages of the SUT which were randomly selected to provide this third type of load request. The random testing may be further refined based on User-defined weighting factors for an individual page or pages. For instance, a User may be aware that its home page generates five times more hits, on average, than the other pages associated with the Testable Site 400. The User may define a weighting factor for the home page that requires that the random load hit the home page five times more often than the other pages of the Testable Site 400.

Once the User has completed building the load test request, he may either submit the load test request immediately, or may save the load test request and submit it at a later date. If he wishes to submit it immediately, he so indicates in operation 512. If the User indicates in operation 512 that he wishes to submit the load test request, then the Setup subsystem 491 (FIG. 4) submits the load test request to the FIFO load test request queue 470 of the LTN 100.

FIGS. 4 and 5C illustrate that, if the User chooses to save the load test request, the Setup subsystem 491 retains the load test request for use at a later time. The User may either exit or return to operation 506, 508, or 510. If the load test request is to be submitted at a later time, submission is initiated by the User via the Load subsystem 497. Authorized Users may access the Load subsystem 497 via secure Web layer 480.

FIGS. 5C and 4 illustrate that the load test request is submitted to the FIFO load test request queue 470 ("FIFO queue"). When the secure Web layer receives an indication that the User has requested in operation 512 that the load test request be submitted to the FIFO queue 470, Setup subsystem 491 writes the request, in operation 514, to the FIFO queue 470. The information in the FIFO queue 470, is used, as described below, by the LTSM 410 to support scheduling and execution of load tests once the User builds a load test request and the load test request has been submitted.

Referring to FIG. 4, the secure Web layer 480 submits the load test request to the FIFO queue 470 using a setup subsystem 491. In most cases, except when the User requests that the LTN 100 automatically probe the SUT and provide random loading, the setup subsystem 491 receives script information that has been captured and recorded by the capture subsystem 493 and placed into the load test database 455. The setup subsystem 491 retrieves information provided by the User in operations 506, 508, and 510 (FIG. 5A) and submits the load test request, based on such information, to the FIFO queue 470.

The load test request that is sent by the setup subsystem 491 to the FIFO queue 470 contains different types of information depending on the type of load test requested by the User. In at least one embodiment, for example, the User's Type 1 load test request specifies the following information: address of the SUT, the start date for the test (the User may specify an "immediate" start time and date if the resources of the LTN 100 are not currently over-allocated), the start time for the test, the duration of the test, number of users to simulate, the specific user scenario to simulate, browser type, browser version, and the user connection speed(s) to simulate. The User can also request an e-mail be sent to him when the test has completed.

In at least one embodiment, the load test request may contain information pertaining to a Type 2 load test that requires, for example, the User to specify the following parameters: address of the SUT, the start date for the test (the User may specify an "immediate" start time and date if the resources of the LTS are not currently over-allocated), the start time for the test, the maximum duration of the test, the maximum number of users to simulate, which specific user scenario to simulate, and the target average Web page response time (i.e. the time required to download a complete Web page to the LTN 100). In one embodiment, this second type of load test ("Type 2 test") executes by gradually stepping up the number of users, according to a User-defined ramp rate, until: 1) the target average Web page load time is reached, 2) the maximum number of users is reached, or 3) the maximum test time is reached. Thus, the Type 2 test allows the User to determine how many simultaneous users a given SUT can support, given a defined, target average Web page load response time.

Figure 5D:
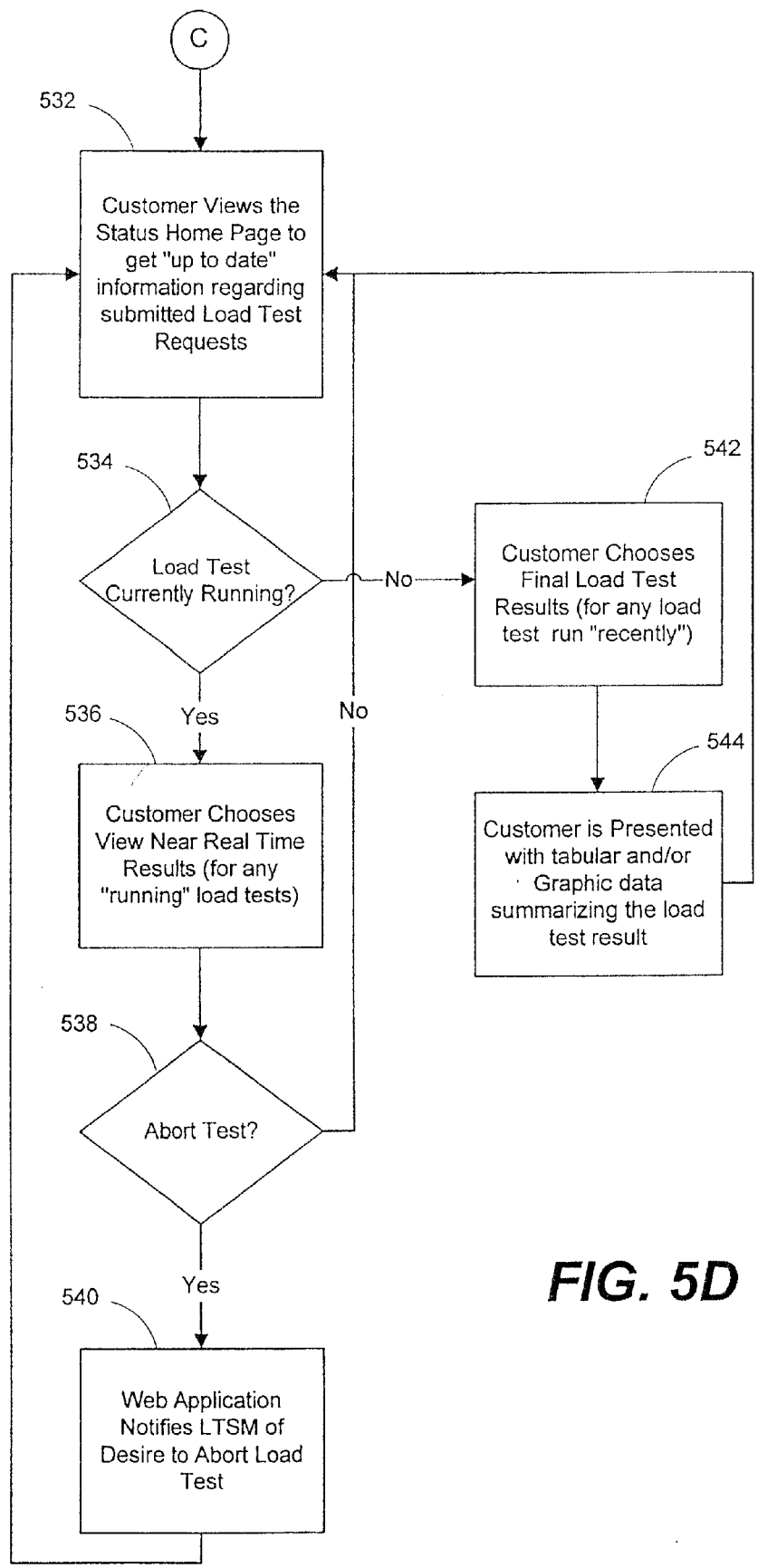

Referring to FIGS. 4 and 5D, from the Status Home Page 481, the User may elect to either view real-time results for any load test that is currently being executed or to view results stored in the load test results database 430. If process 534 of FIG. 5D determines that a load test is currently running, then the User may choose, in process 536, to view real-time results for any load tests that are currently in process. Otherwise, User may elect in processes 542 and 544 to view load test results from recently completed load tests. After the results have been viewed in process 544, the User returns to access the Status Home Page 481 in process 532. From the Status Home Page 481, the User 450 may choose to view additional test results, or he may choose to exit the Status Home Page 481.

If the User 450 chooses to view real-time data during execution of a load test, the real-time data may indicate that the results are not as expected. When that occurs, the User 450 has the option to abort the test. If process 538 of FIG. 5D determines that the User 450 has chosen to abort the currently-executing load test, then the LTSM 410 is notified in process 540 of the User's desire to abort the load test.

FIG. 5D illustrates that a User 450 may repeatedly access the Status Home Page 481 to review the results of multiple tests, or to repeatedly review the results of the same test. After a predetermined period of time, the results of a completed load test are no longer considered by the LTN 100 to be "up to date" results, and, as discussed above, are deleted from the load test results database 430. If a User wishes to save such results before deletion, the results may be downloaded from the secure web layer 480 to the User's own computer system 450, 450*c*.

FIG. 12 illustrates an embodiment where one or more load test requests from one or more Users 450 are dynamically allocated among a plurality of N load cells 300, where each load cell 300 is capable of communicating with Testable Site 400. By coordinating allocation of LTN 100 of load tests among N load cells 300, resources of LTN 100 may be efficiently utilized and an efficient, cost effective load testing procurement system may be implemented. Dynamic allocation of load tests may also provide more realistic end user simulation of a geographically dispersed user base by allocating load tests to geographically dispersed load cells. Another advantage of dynamic allocation is that efficiency can be maximized, in terms of load testing capacity utilization when a load test request is canceled before execution. Dynamic allocation allows resources that would have otherwise been allocated to the canceled load test to be allocated to other load tests.

FIG. 12 illustrates that a User 450 enters a load test request to the LTS 200. Within the LTS 200, the work allocator 435 dynamically allocates the load test among a plurality of load cells 300. The load cells 300 may be physically distinct hardware servers or may be logically distinct portions of the same hardware server. The dynamic allocation process is described below in greater detail in connection with the discussion of FIGS. 7A, 7B, and 7C.

FIG. 13 illustrates an embodiment wherein the LTS 200 receives one or more load test requests 1202 from one or more Users 450 to load test a plurality of SUTs. The work allocator 435 within the LTS 200 allocates load tests 1 through N to be performed during each requested load test among one or more load cells 300. Each load test request specifies one or more SUTs for load testing and a load test is generated for each of the SUTs in accordance with the load test request associated with each SUT. Load cell(s) 300 apply load test 1 through N to SUTs 1 through N, respectively. In this manner, the LTS 200 implements load testing of multiple SUTs 400.

FIG. 14 illustrates an embodiment of the LTS 200 that supports receipt of multiple concurrent load test requests 1202 pertaining to one or more SUTs 400. LTS 200 can maintain multiple pending load test requests 1202, where the multiple load test requests 1202 define concurrent or staggered load testing for one or more SUTs 400. Multiple Users can submit multiple load test requests concurrently for one or more SUTs 400. Similarly, one User may submit more than one multiple load test requests for one or more SUTs 400 to the effect that the LTS 200 maintains multiple pending load test requests for one or more SUTs.

FIG. 6, which consists of FIGS. 6A and 6B, illustrates the functions performed in at least one embodiment by the Load Test System Manager 410 ("LTSM", FIG. 4) in processing the load test requests in the FIFO queue 470. The LTSM 410 acts as a global scheduler to schedule the requested load tests. The LTSM 410 function is multithreaded. Thus, multiple simultaneous paths of the functions illustrated in FIG. 6 may therefore execute at the same time.

Operation 610 in FIG. 6 shows that the LTSM 410 continuously loops through all the load test requests in the FIFO queue 470. Requests are processed on a First-In-First-Out (FIFO) basis. Any scheme for implementing a FIFO structure may be employed. In one embodiment, the queue is a series of load test requests maintained in a database, with FIFO operation enforced according to a time and date tag associated with each request. In an alternative embodiment, FIFO operation is implemented through use of a queuing technology, such as the Microsoft Message Queue Server (MSMQ). Concurrency control is used to enforce FIFO operation when multiple paths are executing. In an alternative embodiment, strict FIFO operation is not observed. For example, certain preferred Users' load test requests may be processed out-of-order in order to afford the preferred Users expedited processing.

In operation 612, the LTSM 410 reads in the next load test request from the FIFO queue 470. In operation 614, the load test request is either accepted or rejected based on the status of the requesting User's account. If the User does not have authority to use the LTN 100 on the requested date at the requested time, the LTSM 410, in operation 616, updates the load test database 455 with an error status to inform the User that the load test request has not been accepted. This situation could occur, for example, if the User has failed to renew his monthly subscription to the LTN 100 services, and therefore has not properly paid to activate his account for the requested future test date.

Operation 620 illustrates a security feature of at least one embodiment of the LTSM 410. In operation 620, the LTSM 410 performs a check to determine whether the User's account is authorized to perform the requested test. This operation 620 will recognize and prevent, for example, a User from requesting that the LTN 100 load a SUT for which the User is not authorized to act. This feature attempts to prevent a User from maliciously overloading a third party's Internet Web site. If the User does not have authority to perform the specified test, then the LTSM 410, in operation 616, updates the load test database 455 with an error status to inform the User that the load test request has not been accepted.

In the event that a load test request is rejected, after operation 616 the LTSM 410 continues its iterative loop through the FIFO queue 470, branching in operation 618 back to operation 612, where it reads in the next load test request from the FIFO queue 470.

If a load test request is accepted, then the LTSM 410 performs operation 622, in which the LTSM 410 calculates the LTN 100 resources, such as load cells 300 and measurement/QA cells 500, that will be needed to perform the requested load test ("ResourcesNeeded"). FIG. 6 indicates that ResourcesNeeded is calculated as a function of various factors that include, in at least one embodiment, the number of simulated users that the load request contains, as well as the type of test to be performed and the type of scenario(s) to be executed by the simulated users (i.e., the type of user behavior to be simulated). Each different scenario reflects a different user behavior selection, and therefore has its own resources requirement. The LTSM 410, in operation 622 (FIG. 6) takes these different requirements into account when it calculates ResourcesNeeded.

After the LTSM 410 calculates in operation 622 the ResourcesNeeded it then determines which resources of the LTN 100 will be available to run the load test. To do so, the LTSM 410 retrieves information from the scheduled/in process database 415.

FIGS. 4 and 6 illustrate that LTSM 410 interacts with the scheduled/in process database 415 when a load test requested has been accepted or, in other words, when the load test request has not been rejected in operation 614 or operation 620. The scheduled/in process database 415 contains information regarding the resources that will be needed for each load test request that has already been accepted by the LTSM 410 in previous iterations through the FIFO queue 470, but that has not yet finished execution. (Many of the accepted load tests may not yet have begun.) The scheduled/in process database 415 maintains a "resources needed" value for each such accepted, but not-fully-executed, load test request. The scheduled/in process database also keeps track of the particular load cells 300 that have been allocated to run each test (allocation is performed by the work allocator 435, as described below). In addition, the scheduled/in process database 415 also maintains an inventory of all load cells 300 that make up the LTN 100, referred to herein as TotalLTSMCapacity.

In operation 624 the LTSM 410 accesses the scheduled/in process database 415 to retrieve all ResourcesNeeded for any and all load tests that i) have been requested and ii) will overlap in time with the new load test request under consideration. Based on this ResourcesNeeded value, the LTSM 410 calculates, in operation 626, a "resources available" value (ResourcesAvailable). In at least one embodiment, the ResourcesAvailable value is calculated by first summing all of the ResourcesNeeded values for already-scheduled load tests that may overlap with the new load test under consideration and then subtracting this summed value from the TotalLTSMCapacity.

The result of the ResourcesAvailable calculation performed in operation 626 may be optimized in operation 628. Such optimization is based on the following factors: an estimated cancellation factor (CancelFactor), a load cell outage factor (LoadCellOutageFactor), and a resource balancing factor (ResourceBalancingFactor). Other factors may be developed, as needed, to allow the LTSM 410 to efficiently allocate resources of the LTN 100 to perform requested load tests.

The CancelFactor is utilized by the LTSM 410 to optimize ResourcesAvailable by taking into account the fact that not all requested load tests will actually be performed. In some instances, the load tests, though accepted by the LTSM 410 and accounted for in the scheduled/in process database 415, are canceled by the User before the tests are begun. This may occur, for instance, when the User's test personnel determine that the SUT is not ready to be load tested. In other cases, the load test may be aborted during testing. The User may abort an in-progress load test when, for instance, the SUT ceases to function during the load test or when the User receives unexpected or unacceptable data using the LTN 100's real-time reporting option. The CancelFactor is determined based on historical data of pre-test cancellations and in-test aborts. It is a value greater than one, such that multiplication of ResourcesAvailable by the CancelFactor increases the ResourcesAvailable value.

In contrast to the CancelFactor, the LoadCellOutageFactor is a factor that reduces the ResourcesAvailable value. The LoadCellOutageFactor has a value less than one and takes into account the fact that not all of the LTN 100's load cells 300 are always operational. Load cells 300 may become unavailable, of course, due to malfunctions of the load cells 300 themselves. In addition, the load cells 300 may become unavailable during scheduled maintenance or when the LTS 200 is unable to communicate with the load cells 300 over the network 700 due to network errors or other communications impediments.

The ResourcesBalancingFactor referred to in operation 628, like the LoadCellOutageFactor, reduces the ResourcesAvailable value. The ResourcesBalancingFactor embodies a value, less than one, that reflects an amount of LTN 100 resources that are to be held aside. In other words, these resources are not available to the LTSM 410 when global scheduling is performed. This factor is useful, for instance, when some LTS resources are to be held aside in order to allow certain Users to request immediate processing of load test requests, rather than submitting them to the FIFO queue 470.

After the ResourcesAvailable value is optimized in operation 628, the LTSM 410 then compares the ResourcesAvailable with the ResourcesNeeded to process the current load test request. This comparison occurs in operation 630. If the ResourcesAvailable does not meet or exceed the ResourcesNeeded value for the current load test request, then the LTSM 410 cannot accept the load test request. In such case, the LTSM 410 performs operation 616, which updates the load test database 455 with an error status to inform the User that the load test request was not accepted. In at least one embodiment, the error status is accompanied by an indication to the User of one or more alternative test times at which the LTN 100 would have sufficient resources available to perform the requested load test. Operation 618 is then performed to branch back to operation 612, where the LTSM 410 reads in the next load test request from the FIFO queue 470.

If, instead, ResourcesNeeded does not exceed ResourcesAvailable, then the LTSM 410 performs operation 632. In this case, the LTN. 100 has sufficient resources available to perform the requested load test. The LTSM 410 considers the current load test request as "confirmed" and writes the confirmed load test request to the scheduled/in process database 415. The information that the LTSM 410 writes to the scheduled/in process database 415 includes the ResourcesNeeded value that has been calculated for the current, newly confirmed, load test request. The LTSM 410 also, in operation 634, updates the load test database 455 with an indication that the current load test request has been confirmed. After this confirmation information is imparted, the LTSM 410 then branches in operation 636 back to operation 612 to read in the next load test request from the FIFO queue 470.

One skilled in the art will realize that the processing performed by the LTSM 410 in FIG. 6 may occur simultaneously for up to N Users. This type of multi-threaded processing requires certain database management techniques that are well-known and well-documented. Concurrency control should be implemented when multiple processing threads can access and update a single database, such as the scheduled/in process database 415 and the FIFO queue 470. Concurrency control is used to enforce FIFO allocation and allocation of resources where applicable.

FIG. 12 and FIG. 7, which consist of FIGS. 7A, 7B, and 7C, illustrate the function performed by the work allocator 435. The work allocator 435 allocates specific LTN 100 resources to run a particular load test, when it is time to run the load test. The work allocator 435 allows the LTS 200 to balance the work allocated to the load cells 300. Depending on the demands on the LTN 100 at any one time, the work allocator 435 may allocate a subset of the total LTS resources to perform certain load tests. Stated another way, the work allocator 435 allocates and sends load test work requests to certain load cells 300, and these certain load cells 300 are determined dynamically. In some instances, this dynamic allocation may be made on a geographic basis. In others, this dynamic allocation may be made on any other relevant considerations. Once such consideration is the available capacity for the required bandwidth of any given load cell 300. Another consideration is the cost of using one particular bandwidth provider versus another to provide the required bandwidth for the load test. Another consideration is a desire to avoid overloading any one particular bandwidth provider during load testing. This task balancing makes scaling the entire distributed load cell 300 network straightforward. While the discussion herein describes at least one embodiment of the work allocator 435, it will be understand that the work allocator 435 may be implemented using any variety of processes that achieve the functionality described. It will also be understood that, in one embodiment, the function of the work allocator is multi-threaded and that multiple instances of the processes illustrated in FIG. 7 may therefore be executing simultaneously.

FIG. 12 illustrates a general overview of the function performed by the work allocator 435. From User 450 the LTS 200 receives at least one load test request regarding a load test to be performed on at least one SUT 400. The work allocator 435 determines that a load test is ready for execution and determines how to best allocate the work to be performed during the load test among a plurality of load cells 300. A load test is generated, with load test data pertaining to the load test being forwarded to each of the load cells 300 that have been allocated a portion of the load test. Each of the load cells 300 that have been allocated all or a portion of the load test send the forwarded load test data to the SUT 400. The load cells 300 then receive responses from the SUT regarding the load test data. Because each load cell 300 has been allocated a portion of the load test, where the portions may or may not be based upon the same scenario, the load cells 300 do not necessarily receive the same responses from the SUT.

FIG. 7 illustrates the operation of the work allocator 435 in more detail. In operation 710, the work allocator 435 polls the scheduled/in process database 415 to determine the requested date and time for each load test request that has been accepted by the LTSM 410. To determine if it is time to begin execution of a previously accepted load test request, operation 710 compares the date and time for each requested load test with the current system date and time.

Based on the comparison performed in operation 710, operation 712 determines whether any load tests are ready for execution. If no load tests are ready for execution, the work allocator loops back to operation 710 and continues to poll the scheduled/in process database 415. This process of polling to find load tests that are ready for execution is referred to herein as the exterior loop 704 of the work allocator 435.

If a load test is ready for execution, the work allocator 435 performs operation 714. In operation 714, the work allocator 453 reads in additional data from the scheduled/in process database 415 regarding the load test that is ready for execution, referred to herein as the current load test. This additional data, referred to herein as load test specification data, indicates to the work allocator 435 such information as the number of users that are to be simulated during the current load test, and the desired duration of the current load test. This information is used by the work allocator to determine which resources of the LTN 100 should be allocated to perform the load test.

Before further discussing the operation of the work allocator 435 illustrated in FIG. 7, a discussion of the resources to which the work can be allocated is set forth. One such resource is a load cell 300x, where x is any of the load cells 300. The LTN 100 includes, in at least one embodiment, one or more load cells 300. Referring to FIG. 1, the load cell 300x is a computer processing system having one or more computers, and associated software, that accesses one or more target sites or sites under test (SUTs) via a network, such as the Internet 700, and loads the SUT in accordance with User-selected load tests. A load cell 300x need not necessarily have a one-to-one correspondence to a dedicated computer. Instead, more than one logically distinct load cell 300x can reside on the same computer. Also, in at least one embodiment, load cell 300x is a highly utilized resource of LTN 100 and thus includes two or more groups of one or more computer systems and associated software. For some load cells 300, it may desirable for performance enhancement to off-load the communications and data logging functions, or other overhead functions, to an additional computer.

The amount of resources available to the work allocator 435 is related to the number of load cells 300 that are included in the LTN 100. The number of load cells 300 is determined by the LTN 100 system administrator, and depends on, for example, balancing the anticipated number of SUTs to be concurrently load tested and the anticipated duration of each SUT's load test with the anticipated complexity of the load test, the quantity of data, such as average Web page size, to be transferred between load cells 300 and SUTs, the processing performance of the load cells 300, the communication bandwidth(s) between load cells 300 and SUTs, and the processing performance of SUTs which, coupled with network congestion, produces user wait times. By balancing such factors, an appropriate number of load cells 300 can be determined.

FIG. 2 illustrates that at least one embodiment of the LTN 100 also includes measurement/QA cells 500. The measurement/QA cells 500 are very similar to the load cells 300 described above. They also may reside in various geographic locations around the world and run the same, or functionally similar, load testing software as the load cells 300. The interface to the measurement/QA cells 500 is identical to that of the load cells, and the measurement/QA cells 500 process data in the same manner as the load cells 300. One difference between load cells 300 and measurement/QA cells 500 is that the measurement/QA cells 500 have several independent, smaller bandwidth connections to the Internet instead of a large bandwidth, single connection, such as a T3 connection. Another difference is that the load test software simulates only a single user on each of these low-bandwidth connections in a measurement/QA cell 500, whereas one or more users are simulated with a load cell 300.

The purpose of the Measurement/QA cells 500 is twofold. First, by using the actual Internet connectivity options that simulated users, whose actions are being simulated during the load tests, actually utilize in the real world, the LTN 100 can generate realistic response times for different types of users. That is, the measurement/QA cell 500 has separate actual Internet connections using most, if not all, of these common connection types (depending upon market demand): 28.8K modem, 33.6K modem, 56K modem, ISDN/64K modem, ISDN/128K modem, Cable Modem, ADSL, and T1. As new connection options become available, they can be added to the measurement/QA cell 500. Thus, if a load test is to simulate a user that utilizes a 28.8K modem to access the SUT, the measure/QA cell can simulate that user by sending the load over an actual 28.8K connection. In contrast, the load cells 300 generally have a large bandwidth, single connection, such as a T3 connection to support multiple simulated users.

The load testing software of the load cells 300, in at least one embodiment, is configured to allow the highest throughput. In other words, software pacing does not occur. In a load cell 300, this results in "unpaced" throughput, because the communications are occurring over a large bandwidth line rather than the type of connection that the actual users utilize when accessing the SUT. In the alternative embodiment illustrated in FIG. 2, the measurement/QA cells run the same software that runs on the load cells 300, when measurement/QA cells are used. In measurement/QA cells, the actual lower-bandwidth connection performs pacing in that it forces the communications between the SUT and the measurement/QA cell 500 to occur at a slower pace. In an alternative embodiment of the measurement/QA cells, the communications between the SUT and the measurement/QA cell 500 can be forced to a slower pace through the use of software pacing coupled with a large bandwidth line instead of through the use of actual lower-bandwidth communications connections. Using the response time statistics generated by these measurement/QA cells 500, the LTN 100 can provide to Users a more realistic view of what their users are actually seeing in terms of Web application page load response times by recording the actual response time over the slower connection.

The second purpose for measurement/QA cells 500 is that of continual quality assurance. The measurement/QA cells 500 help verify that accurate numbers for response time are being simulated, captured, and recorded by the load cells 300. While the load cells 300 provide load and also measure response time statistics, the measurement/QA cells 500 provide only response time statistics; no significant load is provided since only one user is being simulated by a measurement/QA cell for any one particular scenario. By comparing and monitoring the response times generated by the load cells 300 with the response times generated by the measurement/QA cells 500, the LTN 100 can continue to guarantee that LTS 200 is providing accurate loading and response time information and provide this information back to Users as a confirmation of service quality.

Referring to FIG. 7, after the work allocator 435 determines that the current load test is ready for execution, and has obtained load test specification data from the scheduled/in process database 415 concerning the current load test (operations 712, 714), it then performs an interior iterative loop 706. This interior loop 706 is a process of allocating resources to perform specified portions of the load test, until all portions of the load test have been allocated. The interior loop 706 takes into account the fact that the same load cell 300 need not simulate all users requested in the load test. The simulation may be allocated among one or more load cells 300, as long as all such load cells 300 are available to run the test at the same time. In other words, if the load test request requests that 1,000 users be simulated in a one-hour period, all 1,000 users be simulated by the same load cell 300 but such wholesale allocation is not necessary. Instead, five load cells 300 could, for example, simulate 200 users each. In at least one embodiment, all load cells 300 involved in the load test load the SUT with their portion of simulated users during the same one-hour period. In this manner, the various load cells 300 to which a load test have been allocated collectively conduct the load test in parallel to simulate concurrent users. In an alternative embodiment, the various load cells 300 to which a load test have been allocated can conduct their allocated portion of the load test serially so that they are not submitting load test data to the SUT 400 at the same time.

FIG. 7 illustrates that the first operation in the interior loop 706 is operation 716, which determines whether the current load test has been fully allocated. The result of this comparison is negative on the first pass through the interior iterative loop 706 for each current load test. On successive passes, if the comparison results in a "true" value, FIG. 7 illustrates that, because the current load test has been fully allocated, the work allocator 435 then exits the interior loop and returns to the exterior loop 704.

If the current load test is not yet fully allocated, then the work allocator 435 performs operation 718. Operation 718 determines whether there are any LTN 100 resources available to which to allocate all or part of the current load test. If not, an error condition exists. If the error condition has occurred on a pass through the interior loop 706 for the current load test except the initial pass, then there are other load cells 300 which have already been allocated a portion of the work for the current load test. In operation 720, the work allocator 435 therefore determines if any such partial allocation has already occurred. If so, the work allocator 435, in operation 720, notifies each such load cell 300 to cancel the allocated work. In operation 722, the work allocator 435 generates a notification that it was unable to allocate the current load test, exits the interior loop 706, and returns to the beginning of the exterior loop 704.

If, on the other hand, operation 718 determines that load cells are available then the work allocator executes operation 724 which selects the "best" load cell from those that are available. The determination of which load cell is "best" is made dynamically, based on such factors as comparative overhead cost of running the load test on one load cell instead of another, geographic location of the load cells, bandwidth provider's capacity, and any other relevant factors. In the event that multiple load cells are equally viable candidates for the "best" load cell, a reasonable method is employed to select one of the multiple candidates.

Once the work allocator 435 has selected a "best" load cell 300, it queries the best load cell 300 over the network 700. The purpose of this query, performed in operation 726, is twofold. First, the work allocator 435 queries the best load cell 300 to get a health status that indicates that the load cell 300 is functioning properly. Second, the work allocator 435 requests information regarding the resources that the load cell 300 has available. This latter portion of operation 726 is executed as a confirmation step to confirm availability information regarding the load cell 300 that the work allocator 435 has received from the scheduled/in process database 415.

Operation 730 determines whether a satisfactory response has been received from the best load cell 300 regarding both health status and resource availability. If not, then the work allocator 435 generates, in operation 732, a notification that the work allocator 435 did not receive a satisfactory response to the health status/resources available query. After generating the notification, the work allocator 435 branches back to the exterior loop 704.

If the work allocator does receive a satisfactory response from the health status/resources available inquiry performed in operation 726, the work allocator 435 then performs operation 734. In operation 734, the work allocator 435 determines the number of users that the best load cell 300 has capacity to simulate, referred to herein as simulation capacity. In at least one embodiment, in operation 736, the work allocator 435 allocates to the best load cell 300 as much of the current load test as possible, based on the best load cell's 300 simulation capacity. In an alternative embodiment, in operation 736 the best load cell 300 is allocated a lesser portion of the load test than the best load cell's 300 simulation capacity. This occurs when, although the load cell 300 is capable of handling a larger portion of the load test, other considerations such as cost and the bandwidth provider's capacity dictate that the best load cell 300 should be allocated a smaller portion of the load test.

The work allocator next performs operation 738, in which the work allocator 435 creates a recipe file for the best load cell.

Turning briefly to FIGS. 9 and 10, the recipe file 920 is used by the load cell test executive 1040. The recipe file 920 is a set of complete instructions for the load cell 300 concerning the actions the load cell 300 is to take when performing its allocated portion of the current load test. The work allocator 435 creates the recipe file 920 using the load test specification data and the simulation capacity. At least one embodiment of the recipe file 920 includes instructions regarding the scenario to be performed, the number of users to simulate, the SUT address, the duration of the test, and the connectivity option to simulate. In one embodiment, the load recipe for a load cell 300 is generated from information provided by the User 450 in the specific fields of the load test request as set forth in the following table:

TABLE 1

| Request Field | Type of Test | Description |
| --- | --- | --- |
| Start Date and Time | All | Specify date and time for future performance of test OR specify "Immediate" execution OR specify "One click" option. |
| Test Duration | All | Minimum 15 minutes; Maximum 30 days |
| Test Type | All | Specify Type 1 (Specific User Count Simulation); Type 2 (Target Average Response Time); or One click load test |
| User scenario | Type 1, Type 2 | One or more may be indicated for each Type 1 or Type 2 test |
| User count multiplier | All | Default to 1.0. For values other than 1.0, the multiplier is used to proportionately scale the user count as specified in the selected scenario. |
| User connection speed | All | Multiple Internet connection speeds may be specified within one load test |
| Target Average Response Time | Type 2 | Desired response time for Type 2 test |
| Minimum Run Time | Type 2 | Minimum desired duration for Type 2 test |
| User count ramp rate | Type 2 | Rate at which simulated user load is to be increased during Type 2 test |
| One click User count | One click | Number of users to simulate |

In one embodiment, the LTN 100 simulates all users at a particular Internet connection speed selected by the User and contained in the recipe file 920. This creates a realistic load on the server hosting the SUT in that slower connections cause socket connections on the server to be open longer, thereby forcing more SUT server resources to be utilized.

Returning now to FIG. 7C, the work allocator 435, in operation 740, sends the recipe file 920, via network 700, to the best load cell 300 and awaits confirmation from the best load cell 300 that it has received the recipe file 920. As is explained below in connection with the load cell manager 1020, the load cell 300 will send to the work allocator 435 an indication of whether the file was received without error and the integrity of the contents of the recipe file 920 appear to be sound (ACK indicator). In operation 742, the work allocator 435 determines whether a positive ACK indicator has been received from the best load cell regarding the recipe file transmission.

FIGS. 7C and 8A illustrate that, if the work allocator has received a NACK indicator, then a failure condition exists because the load cell manager 1020 was unable to confirm the integrity of the recipe file in process 816 of FIG. 8A. The type of further processing performed by the work allocator 435 depends on the number of consecutive failure conditions. If the failure has occurred for the first time, then the work allocator 435 performs operation 740 again, thereby re-sending the recipe file 920 to the best load cell 300. If, instead, the failure has occurred more than once, then the work allocator performs operation 756. In operation 756 the work allocator 435 generates a notification of the failure. The work allocator 435 then branches back to the interior loop 706. This processing effectively "skips" the best load cell due to the failure condition.

If the work allocator 435 receives a positive ACK indication, then the work allocator 435 performs operation 744. In operation 744, the work allocator 435 updates the scheduled/in process database 415 to indicate the best load cell's participation in the current load test. This operation 744 renders the best load cell a "participating" load cell. In operation 746, the work allocator 435 next determines whether the current load test has been fully allocated. If not, the work allocator 435 branches back to the beginning of the interior loop 706, where the work allocator 435 will repeat the process described above in order to select a new best load cell from among the remaining available load cells 300.

If the work allocator 435 determines in operation 746 that the current load test has been fully allocated, then the work allocator 435 performs operation 750. In operation 750 the work allocator 435 notifies each of the participating load cells 300 that the current load test is fully allocated and that it is now time to run the test. This notification is referred to herein as the "good-to-go" status. After sending the good-to-go status to each participating load cell 300, the work allocator 435 awaits a "good-to-go confirmation" from each load-cell, where the good-to-go confirmation indicates that the load cell is operational and is prepared to perform its allocated portion of the current load test (as specified in the recipe file 920 it received).

In operation 752, the work allocator 435 determines whether it has received a good-to-go confirmation from each of the participating load cells. If so, it performs operation 754, where it updates the scheduled/in process database 415 to indicate that the current load test is being performed. Then, the work allocator 435, having completed its processing concerning the current load test, branches to the beginning of the outer loop 704 in order to begin polling for a fresh load test.

If, instead, the work allocator 435 determines in operation 752 that it has not received a good-to-go confirmation from each participating load cell, then the work allocator 435 performs operation 720, where it informs each participating load cell 300 to cancel the pending load test. This cancellation prevents performance of only part of the load test that was requested by a User. After informing the load cells of the cancellation, the work allocator 435 performs operation 722, where it generates a notification that it was unable to allocate the current load test, and returns to the beginning of the exterior loop 704.

As shown in FIG. 10, each load cell 300 includes a load cell manager 1020, a load cell test executive 1040, and a data buffer 1030. Generally, the load cell test executive 1040 performs the instructions in the recipe file 920 and writes the result data to the data buffer 1030. The load cell manager 1020 communicates with the work allocator 435 and sends result data from the data buffer 1030 to the data collection system 420. This process is multi-threaded, in that the load cell test executive 1040 can perform multiple load tests concurrently.

FIG. 10 and FIG. 8, which includes FIGS. 8A and 8B, illustrate the function of the load cell manager 1020. The function performed by the load cell manager 1020 is multi-threaded and multiple simultaneous execution paths may be active at the same time. The load cell manager 1020 acts as the interface for the load cell 300 regarding communications with the work allocator 435. FIG. 8 illustrates that the load cell manager 1020 periodically synchronizes the clock of the load cell 300 with a standard time.

In operation 811, the load cell manager 1020 determines whether it has received from the work allocator 435 a health status/resources available inquiry. This inquiry is generated by the work allocator 435 in operation 726 (FIG. 7). If the load cell manager 1020 determines that such an inquiry has been received, then it executes operation 813, which forwards the status to the work allocator. The work allocator evaluates this status in operation 730 (FIG. 7). Whether or not the health status/resources inquiry has been received, the load cell manager 1020 proceeds to execute operation 812.

In operation 812, the load cell manager 1020 determines whether it has received a new load test recipe file 920 from the work allocator 435. If so, the load cell manger 1020, in operation 814, indicates to the work allocator 435 that it has received the recipe file 920 by sending a file received indicator to the work allocator 435. The load cell manager 1020 then determines in operation 816 whether the contents of the recipe file 920 appear to be valid. This operation 816 may be performed using a data checksum or any other data validation operation.

If the load cell manager 1020 determines in operation 816 that the contents of the recipe file 920 appear to be valid, then it performs operation 818, which sets a valid contents indicator, an ACK indicator, and sends it to the work allocator 435 to confirm recipe file 920 integrity. If, instead, the load cell manager 1020 determines in operation 816 that the contents of the recipe file 920 do not appear to be valid, then it sends a NACK indicator to the work allocator 435. When this occurs, the load cell manager also deletes the recipe file 920 from its memory (operation 828) and branches back to operation 811 to await further communications from the work allocator 435.

Continuing now with the function of the load cell manager 1020 when a valid recipe file 920 has been received, the load cell manager 1020 executes operation 820 after it has sent the file ACK indicator, in operation 818, to the work allocator 435. In operation 820 the load cell manager 1020 processes the recipe file 920. In doing so, the load cell manager 1020 instructs the load cell test executive 1040 to set up the load test in preparation for execution. In addition, the load cell manager 1020 instructs the load cell executive 1040 to await further instruction before beginning execution of the load test.

In operation 822 the load cell manager 1020 next stands ready to receive a good-to-go indicator or a cancel notification from the work allocator 435. This process allows each load cell 300 to set up its portion of the load test, but to forestall executing the test until all portions of the load test have been allocated and set up by the various load cells 300 to which they have been allocated. In process 822, the load cell manager 1020 tracks the passage of time. The load cell manager detects in process 822 whether a timeout has occurred.

When the load cell manager 1020 receives a transmission from the work allocator 435 in operation 822, or if a timeout has occurred, the load cell manager 102 then executes operation 824. In operation 824 the load cell manager 1020 determines whether it has received a good-to-go indicator, it has received a cancel notification, or if a timeout has occurred because it has failed to receive a transmission from the work allocator 435 during the timeout period. Upon a cancel notification or timeout, an abort is necessary. In such case, the load cell manager 1020 executes operation 844, in which it deletes the recipe file 920 from the load cell's memory. FIG. 8 illustrates that the load cell manager 1020 then branches back to operation 811 to await further communication from the work allocator 435.

If the load cell manager 1020 determines in operation 824 that it has received a good-to-go indicator within the timeout period, it then executes operation 846, which sends a good-to-go confirmation to the work allocator 435. (The work allocator receives the good-to-go confirmation in operation 750 of FIG. 7). The load cell manager 1020 then executes operation 848, in which the load cell manager 1020 instructs the load cell test executive 1040 to begin execution of the "holding" load test.

After the load cell test executive 1040 begins execution of the load test, it begins to fill the data buffer 1030 (FIG. 10) with data resulting from the load test, as described below. Meanwhile, the load cell manager 1020 monitors the data buffer 1030 in operation 842 to determine whether the result data should be forwarded to the data collection system 420 (FIG. 4). The data buffer 1030 is a predetermined size and must be periodically emptied to the data collection system 420 in order to avoid buffer overflow. In operation 840 the load cell manager 1020 determines if any of three conditions are met. Each of the three conditions, if true, require that the contents of the data buffer 1020 be forwarded to the data collection system 420.

The first condition that the load cell manager 1020 checks in operation 840 is whether the data buffer 1030 is nearing maximum data capacity. In other words, the load cell manager determines whether the data buffer 1030 needs to be emptied. The second condition is whether a time-trigger condition has been met. That is, some load tests may generate less than a buffer-full of data. In such cases, a predetermined time trigger is used to prevent data from becoming stale in the data buffer. If the time-trigger condition is met, the load cell manager 1020 forwards the data in the data buffer 1030 to the data collection system 420, even though the data buffer 1030 may not be full. Finally, the third condition that the load cell manager 1020 monitors in operation 840 is whether the execution of the recipe file 920 has been completed.

If any of the three conditions above are met, then the load cell manager 1020 executes operation 836. In operation 836, the load cell manager 1020 formats the data from the data buffer 1030 and sends the formatted data to the data collection system 420. The formatted data makes up a "packet" that includes the data from the data buffer, along with a header that identifies which load cell 300 is sending the data and also identifies which recipe file 920 was run by the load cell 300 to generate the data.

If the load cell manager 1020 determines in operation 840 that none of the three conditions have been met, then it branches back to operation 842 to continue monitoring the amount of data that has accumulated in the data buffer 1030.

After the load cell manager 1020 forwards the "packet" to the data collection system 420, it performs additional processing. In operation 830, the load cell manager 1020 determines whether it has received a "stop work" order. The stop work order is generated by the User during execution of the load test, and may be generated, for instance, when the User determines that the data being generated during the test indicates that the SUT operation is faulty and that completion the load test would therefore be unproductive. If the load cell manager determines that it has received a stop work order, it then executes operation 832, which effectively aborts the load test. In operation 832, the load cell manger 1020 instructs the load cell test executive 1040 to force a shut-down of recipe file 920 execution immediately. After executing operation 832, the load cell manager 1020 branches to operation 812 and awaits further communication from the work allocator 435.

If the load cell manager 1020 determines in operation 830 that it has not received a stop work order, it then executes operation 834, where it determines whether the load cell test executive 1040 has indicated that it has completed execution of the recipe file. If execution of the recipe file 920 is complete, then the load cell manger 1020 branches to operation 812 and awaits further communication from the work allocator 435.

If, on the other hand, execution of the recipe file 920 is not complete, then the load cell manager 1020 branches back to operation 840 to begin monitoring the data buffer 1030 anew, to determine when it is time to generate a new "packet" of result data.

FIG. 9 illustrates the function of the load cell test executive 1040. The load cell test executive 1040 performs its allocated portion of the load test, as specified in the recipe file 920, and writes results to the data buffer 1030 (FIG. 4). Its processing is structured, in at least one embodiment, as a basic message event loop. In operation 910 the load cell test executive 1040 awaits for, and receives, a command from the load cell manager 1020. During operation, the load cell 300 may be in one of several states. In operation 912, the load cell test executive 1040 determines whether the command received in operation 910 is a valid operation for the load cell's current state. If not, the load cell test executive performs appropriate error handling (not shown) and returns to operation 910 to await a new command.

If the command is valid for the load cell's 300 current state, then the appropriate processing is performed. For an "abort" command, the load cell test executive 1040 performs operation 914. In operation 914, the load cell test executive 1040 sets the load cell's current state to an "abort" state and executes a shutdown sequence. The load cell test executive 1040 then branches back to operation 910 to await a further command from the load cell manager 1020.

If an "initiate" command arrives from the load cell manager 1020, then the load cell test executive 1040 executes operation 916. In operation 916, the load cell test executive 1040 performs all actions necessary to begin execution of its allocated portion of the load test as specified in the recipe file 920. Once this preparation has been performed, the load cell 300 is ready to begin execution. The load cell test executive 1040 so indicates by setting the load cell's 300 state to a "hold" state. The load cell test executive then branches back to operation 910 to await a further command from the load cell manager 1020.

If the load cell test executive 1040 receives a "good-to-go" command from the load cell manager 1020, then the load cell test executive 1040 executes operations 918 through 930. In operation 918, the load cell test executive 1040 releases the load cell from a "hold state" by setting the load cell's 300 state to a "testing" state. The load cell test executive 1040 next performs operation 919, in which the load cell test executive 1040 begins executing its allocated portion of the load test as specified in the recipe file 920.

The load cells 300 and measurement/QA cells 500 communicate with the target Web server that hosts the SUT by using, for example, a standard Internet protocol such as the HTTP protocol. In operation 922, a sequenced load test data from the recipe file 920 is sent to the SUT. The load test data may be an HTTP request such as a "put" or "get" command, but may also be a message, other command in HTTP protocol or any other protocol, data, other information, or any combination thereof. For each load test data from each simulated user, a new socket is created by load cell test executive 1040 and an asynchronous write is performed to send the load test data to the SUT. (The rationale for asynchronous communications is discussed below). The SUT then processes the load test data, opens a new socket connection, and initiates a write back to the requesting load cell test executive 1040 and returns a response. In many cases, the response will contain a requested message such as a Web page.

Also in operation 922, the load cell test executive 1040 measures the response times, which reflect the "round trip" transaction time from the time the load cell test executive 1040 sends a load test data to an SUT to the time the load cell test executive 1040 receives a response from the SUT. In one embodiment, the SUT responses include web pages that are requested in the load data.

In one embodiment, the load cell test executive 1040 reads the responses from the SUT asynchronously to improve performance. When performing multiple read/write operations that do not individually require a significant amount of processing, a processor's resources are more efficiently used by performing asynchronous read/write operations. Each load cell 300 achieves its scalability and performance by using asynchronous socket programming to perform both asynchronous writes to a socket and asynchronous reads from a socket during execution of process 922 using, in one embodiment, I/O completion ports. Completion ports are provided, for example, by Microsoft Corporation's Windows NT™ and Windows 2000™ operating systems. Many independent users can be simulated more efficiently by using a small pool of worker threads associated with a completion port rather than having a separate thread for each user that "blocks" regularly. A thread that blocks operates somewhat synchronously in that it waits for some predefined event to happen before it unblocks and delivers data. "Context switches" utilize significant amounts of Load Cell 300 CPU resources, so reducing the number of threads generally enhances performance of the Load Cell 300 dramatically.

As an alternative to using I/O completion ports, Microsoft's WinInet DLL Application Programming Interface (API) can be utilized for building the load generation software. The advantage of this approach is that the creation and management of the HTTP protocol (e.g., HTTP headers) is much easier. Also, WinInet supports more complex protocols, such as Secure Sockets. Using this API removes the need to implement much of the HTTP protocol and other features such as Secure Sockets support. The disadvantage of utilizing the WinInet DLL is that it is much less scalable (within one computer) and requires additional computers to provide the same amount of simulated load.

As a third alternative, a hybrid approach may be utilized whereby the scalability of the asynchronous reads and writes of the Windows I/O completion ports is used in conjunction with the ease of use and added capabilities of the WinInet DLL.

In one embodiment, to simulate various connection speeds to the SUT by the simulated users, the load cell test executive 1040 paces its reading of the incoming SUT responses in the socket buffers to produce appropriate throughput (Bytes/second). The execution times for each of these activities is measured for every socket operation. For Web pages with non-dynamic page element names, there is no need to parse the response data. If dynamic page element names are to be supported on data-entry-type forms, the HTTP and HTML information must be parsed to determine what filenames to send back to the target Web server as part of the submit or post of the data entry form.

For reporting purposes, the total "round trip", transaction time for each request and response is broken down into the following components: Send Time (time to send request to SUT); SUT response Time (time required by the server of the SUT to process the request and to send the first byte of a response); and Receive Time (time measured from the first byte of response data received until receipt of response data is complete).

The total response time for request response each transaction is represented by the following formula: Total Transaction Time=Send Time+SUT Response Time+Receive Time. Knowing the SUT Response Time provides information on hardware and Web application performance. Many Users using the LTN 100 are most interested in the Server Response Time. Send Times and Receive Times are heavily dependent upon the transmission rate of the SUT 400, the bandwidth of the Internet 700, and the size of the response to a transaction request. The size of the response depends in large part on the message body of the response. The message body of the response may consist of small amounts of data, such as authentication data, or may consist of a relatively large amount of data such as a large HTML Web page file.

The SUT Response Time, in one embodiment, is the sum of HTML load time and user "think" time. This user think time is provided as part of the load cell's 300 simulation. In at least one embodiment, the load cell introduces randomness into the user think time. This allows the behavior of the simulated users to appear out of phase in relation to each other, from the SUT's perspective. Another embodiment incorporates into its simulation of user think time an assumption that users do not always wait for all of the graphics file(s) associated with a Web page appear on the screen before the user makes a response.

In addition to measuring simulated user response times in operation 922, at least one embodiment of the load cell test executive 1040 measures, in operation 924, other pertinent performance characteristics and system metrics, such as the amount of CPU resources being utilized during the load test.

During the load test, the load cell test executive 1040 also executes operation 926, which writes the measurement data from operations 922 and 924 to the data buffer 1030. As described above, the load cell manager 1020 periodically formats the data into packets and forwards it to the data collection system 320 in operation 836 of FIG. 8.

Returning to FIG. 9, the load cell test executive 1040 executes operation 927 to determine whether it has completed execution of its allocated portion of the load test. If so, the load cell test executive 1040 executes operation 928. The load cell test executive 1040 executes operation 928 both upon normal completion and also upon an error condition during testing. In operation 928 the load cell test executive 1040 resets the load cell's 300 internal state to a non-load testing "quiescent" state and performs other exit tasks, such as a shutdown sequence. If the load test was terminated due to an error condition, the load cell test executive 1040 performs error recovery and notification tasks to the load test requesting User as well (not shown).

Upon completion of the load test, the load cell test executive 1040 notifies the load cell manager 1020, in operation 930, that it has completed its allocated portion of the load test. The load cell test executive 1040 then branches back to operation 910 and awaits a further command from the load cell manager 1020.

FIG. 11 illustrates the function performed by the data collection system 320 when it receives packets of measured data from the load cell manager 1020. As a load test runs, multiple statistical data points are gathered and logged by the LTN 100. SUT response time data is collected for each request written to the SUT, as well as response data sizes, errors, packet routing information, and other information that can be determined from the load test and is of interest to the User. These data points are compressed and forwarded to the data collection system 320 as described above. In one embodiment, the load cells 300 are capable of storing approximately 24 hours' worth of response data as a safeguard against losing data in the event there is a problem connecting to the data collection system 320.

Response data from an SUT often includes an HTML Web page. A typical Web page consists of one index file that references one or more secondary page files such as GIF or JPEG image files, ActiveX controls, or Java applets. In one embodiment, the load cell 300 accurately simulates the way Web browsers (e.g., Microsoft Internet Explorer) request and receive secondary page files and thus, provides realistic response and performance numbers from a user's perspective. Secondary page files are downloaded using parallel socket connections which simulates an actual Web browser functions. The load cell 300 determines the response time data for each Web page response by determining the time to receive an entire page including all of the secondary files that make up the page and sends the response time data to the data collection system 320. The page load statistics take into account the parallel download through the shared paced bandwidth for parallel socket connections to accurately measure entire page load times which would be experienced by a simulated user using a Web browser. The parallel sockets/connections share the paced bandwidth. The load cell 300 does have available to it the response statistics for every individual file. However, these will generally only be provided if a User requests such information.

In operation 1102, the data collection system 320 receives a packet of measured data from one or more load cell managers 1020. Each packet is forwarded to the data collection system 1020 via the network 700. In operation 1104, the data collection system 320 next opens the packet to extract from the header the identity of the load cell that has forwarded the packet. The data collection system 320 also extracts from the header an indication of recipe file the load cell 300 executed to generate the measured data contained in the packet.

After extracting such information, the data collection system 320 then uncompresses the measured data, if necessary, and formats the measured data into a format suitable for Web application reporting. This formatted data is referred to herein as "meta" data. The meta data is clearly indexed to a particular User and a specific load test so that the results can be recalled whenever necessary. To create the meta data, the data collection system 320 performs any necessary conversions, data translations, or calculations necessary to create a simple and easy-to-access database for reporting of load test data to Users. For instance, the data collection system 320 uses the measured data to calculate running averages of response time and page sizes. In addition, the measured data is manipulated in at least one embodiment to perform pre-processing necessary for graphic display of load test results. In order to increase performance, the standard reports can be generated and saved to the load test results database 430, while the raw data is set aside as a Binary Large Object ("BLOB").

In operation 1108 the data collection system 320 then writes both the, measured data and the meta data to the load test results database 430 to generate a load test report. Thereafter, the data collection system branches back to operation 1102 and continues processing additional packets as they are received.

FIG. 5D illustrates that a User 450 may retrieve and view result data generated by a load test request that the User 450 has previously submitted. The User 450 has the option of viewing the results of a current test as the test is run, in real-time (taking latency into account). Alternatively, the User 450 may view post-test results from a load test that has completed execution. FIG. 5D illustrates that User access to both in-progress and post-test load test reports is gained in process 532 through a Status Home Page 481 via the secure Web layer 480. The LTN 100 maintains the load test results for both in-progress and completed tests in the load test results database 430. In order to support both real-time viewing of test results as well as the storage of post-test results in the load test results database 430, the database server that handles the load test results database 430 is scalable to handle the load of "writing" many test data points while also allowing Users to "read" the load test reports using the secure Web site 380. In the preferred embodiment, the database server that handles the load test results database 430 is an SQL database server. In alternative embodiments, the database server that handles the load test results database 430 is any relational database server, hierarchical database server, or object store database server.

Regarding results of load tests in progress, the LTN 100 provides a summary of the current load test session, including the maximum users reached for the target average response time, the time elapsed since execution of the load test began, average page response time for selected connection speeds, average page round time, and minimum and maximum page round time.

Regarding post-test results, the completed test results are maintained in the load test results database 430 for a limited time period before they are deleted. This practice saves space in the database 430 for the results of subsequent load tests. Users may be encouraged through the public or secure Web layers 360, 380 to download and save any results that they wish to permanently save. An easy interface is provided via the secure Web layer 480 for downloading any or all of the User's test results from the load test results database 330. Results are always accessed via a secure VPN link and the User can completely delete its post-test data from the load test results database 330 at any time.

Post-test results of a load test are manipulated and presented in an easy-to-read format that allows the User to assess the scalability and performance of the SUT during the load test performed on it. One format is the Response Time Report, which shows the average, minimum, and maximum response times for each individual page. The LTN 100 further breaks the figures down to show these numbers for various Internet bandwidth classes including: 28.8K, 33.6K, 56K, ISDN64K, ISDN128K, Cable Modem, and T1. By viewing the Response Time Report, the User can see exactly what his user's response times at the SUT will be, depending on the particular User's SUT bandwidth configuration. All of the numbers are also summarized and averaged for the entire SUT.

Another format for post-test results is the Response Time Distribution Report. This report breaks down response times into percentiles, providing useful information about typical user characteristics and how they impact the User's SUT configuration (e.g., "90% of our users' page loads using 56K or below connectivity are less than 10 seconds."). The LTS also provides an option for Users to view this information in graphical form. A detailed log of each hit may also be provided to the User.

The final subsystem of the secure Web site to be discussed in more detail is the internal Web control site 440, illustrated in FIG. 4. This internal Web control site 440 manages processes internal to the LTS 200. For instance, the internal Web control site 440 allows authorized managers of the LTN 100 to change architectural settings, monitor status of the various subsystems and generate related reports, and provide support when technical problems arise. For example, the internal Web control site 440 will allow new load cells 300 to added and configured to the LTN 100.

While the invention has been described with reference to various embodiments, it will be understood that these embodiments are illustrative and that the scope of the invention is not limited to them. Many variations, modifications, additions and improvements of the embodiments described are possible. For example, those skilled in the art will readily implement the steps necessary to provide the structures and methods disclosed herein, and will understand that the process parameters, materials, tools, application software, and dimensions are given by way of example only and can be varied to achieve the desired structure as well as modifications which are within the scope of the invention. Variations and modifications of the embodiments disclosed herein may be made based on the description set forth herein, without departing from the scope and spirit of the invention as set forth in the following claims.

I claim:

1. A method of load testing at least one site under test (SUT) in accordance with at least one load test request which provides information for load testing at least one SUT, the method comprising:

reviewing at least one load test request;

generating at least one load test corresponding to at least one load test request;

allocating the load test to a plurality of load cells;

sending respective load test data in accordance with the load test from the load cells to at least one SUT to collectively conduct the load test; and receiving responses with the load cells to the load test data from the SUT.

2. The method as in claim 1 wherein allocating the load test to the plurality of load cells comprises:

determining an availability of a sufficient number of the plurality of load cells which are available to collectively conduct the load test of at least one SUT; and distributing the load test to the number of the available load cells until the load test is fully allocated among the plurality of load cells.

3. The method as in 1 wherein at least one of the number of the available load cells is geographically remote from the at least one SUT.

4. The method as recited in claim 1 wherein the at least one load test request comprises a test type field that includes a value corresponding to one of a plurality of test types.

5. The method as recited in claim 4 wherein the plurality of test types includes a first load test request type, a second load test request type, and a one-click load test request type.

6. The method as recited in claim 5 wherein the first load test request type comprises:

an SUT address field;

a requested test start date field;

a requested test start time field;

a requested test duration field;

a requested simulated user multiplier field; and a requested user scenario field.

7. The method as recited in claim 6 wherein the first load test request type further comprises:

a browser type;

and a browser version.

8. The method as recited in claim 5 wherein the second load test request type comprises:

an SUT address field;

a requested test start time field;

a requested test duration field;

a requested test start date field;

a requested maximum number of users to simulate field;

a requested user scenario field; and a target average response time field.

9. The method as in claim 1 further comprising:

generating a load test report based on the received response.

10. A load test report generated in accordance with the method recited in claim 9.

11. The method as in claim 1 further comprising:

receiving a plurality of load test requests;

reviewing the plurality of load test requests;

generating a plurality of load tests corresponding to the load test requests;

allocating the load tests to the plurality of load cells; and conducting a plurality of load tests of at least one SUT in accordance with respective load test requests, wherein at least one load test is conducted by more than one of the load cells.

12. The method as in claim 11 further comprising:

conducting a plurality of load tests of a plurality of SUTs in accordance with respective load test requests, wherein at least one load test is conducted by more than one of the load cells.

13. A network system to load test at least one site under test (SUT) in accordance with at least one load test request submitted by a user system, the system comprising:

at least one computer having a processor and a memory coupled to the processor, wherein the processor includes circuitry to receive a load test request from a user system to load test at least one SUT; and program code stored by the memory and executable by the processor, wherein the program code comprises instructions for:

reviewing the request to load at least one SUT;

generating at least one load test based upon at least one load test request;

allocating the load test to a plurality of load cells;

sending respective load test data in accordance with the load test to at least one SUT from the load cells;

receiving responses to load test data from at least one SUT, wherein the load test data correlates with the load test; and generating a load test report based on the received responses.

14. The network system of claim 13 wherein each of the plurality of load cells comprises:

a load cell manager;

a load cell test executive; and a data buffer coupled to the load cell manager and the load cell test executive.

15. The network system of claim 13 wherein the processor further includes circuitry to receive, via the Internet, a load test request from a user system to load test at least one SUT.

16. The network system of claim 13 wherein the program code is logically partitioned into a plurality of functional subsystems, the functional subsystems comprising:

a public web site layer;

a private web site layer;

a load test database;

a load test system manager;

a work allocator; and a data collection system.

17. A load test report generated by the network system recited in claim 13.

18. The network system of claim 16 wherein the load test database is capable of storing login information, security information, captured user simulation scripts, and scenarios.

19. The network system of claim 16 wherein the load test database includes a relational database server.

20. The network system of claim 16 wherein the load test database includes a hierarchical database server.

21. The network system of claim 16 wherein the load test database includes an object store database server.

22. A computer-readable medium having a computer program accessible therefrom, the computer program comprising instructions for:

reviewing a request to load at least one site under test (SUT);

generating at least one load test based upon at least one load test request;

allocating the load test to a plurality of load cells;

sending respective load test data in accordance with the load test to at least one SUT from the load cells;

receiving responses to load test data from at least one SUT, wherein the load test data correlates with the load test; and generating a load test report based on the received responses.

23. A load test report generated in accordance with the computer program recited in claim 22.

24. The computer program product of claim 22 wherein the computer readable medium includes any of a magnetic storage medium, including disk and tape storage medium; an optical storage medium, including compact disk memory and a digital video disk storage medium; a nonvolatile memory storage memory; a volatile storage medium; and data transmission medium including packets of electronic data and electromagnetic waves modulated in accordance with the instructions.

25. An apparatus comprising:

means for reviewing at least one load test request, wherein the load test request includes information for load testing at least one site under test (SUT);

means for generating at least one load test based upon at least one load test request;

means for allocating the at least one load test to a plurality of load cells;

means for sending respective load test data in accordance with the load test from the load cells to at least one SUT to collectively conduct the load test; and means for receiving responses with the load cells to the load test data from the SUT to the respective load test data.

26. An apparatus for load testing at least one site under test (SUT) in accordance with at least one load test request generated with a user data processing system, the apparatus comprising:

a plurality of load cells capable of communicating with the at least one SUT;

a load test system capable of communicating with the load cells and the user data processing system, the load test system having a work allocator capable of (i) receiving the at least one load test request, (ii) querying the plurality of load cells to select a group of the load cells which is available to collectively process the at least one load test request, and (iii) selecting the group of load cells to allocate load test tasks to the select group of load cells to collectively process the at least one load test request.

27. A method of load testing a plurality of sites under test (SUTs) in accordance with at least one load test request that provides information for load testing the plurality of SUTs the method comprising:

reviewing at least one load test request;

generating at least one load test based on one load test request;

allocating at least one load test to at least one load cell;

sending respective load test data in accordance with the load test from the load cells to the SUTs to conduct the load test; and receiving responses with at least one load cell to the load test data from the SUTs.

28. The method as in claim 27 further comprising:

generating a load test report based on the received responses.

29. A load test report generated in accordance with the method recited in claim 28.

30. The method as in claim 27 further comprising:

receiving a plurality of load test requests;

reviewing the plurality of load test requests;

generating a plurality of load tests corresponding to the load test requests;

allocating the plurality of load tests to at least one load cell;

sending respective load test data in accordance with the plurality of load tests from the at least one load cell to the SUTs to conduct the load tests; and receiving responses with the at least one load cell to the respective load test data from the SUTs.

31. A network system to load test a plurality of sites under test (SUTs) in accordance with at least one load test request submitted by a user system, the system comprising:

at least one computer having a processor and a memory coupled to the processor, wherein the processor includes circuitry to receive a load test request from a user system to load test at least one SUT; and program code stored by the memory and executable by the processor, wherein the program code comprises instructions for:

reviewing at least one load test request;

generating at least one load test based on one load test request;

allocating at least one load test to at least one load cell;

sending respective load test data in accordance with the load test from the load cells to the SUTs to conduct the load test;

receiving responses with at least one load cell to the load test data from the SUTs; and generating at least one load test report based on the received responses.

32. The network system of claim 31 wherein the at least one SUT comprises one or more application servers.

33. The network system of claim 31 wherein the at least one SUT comprises one or more database servers.

34. A load test report generated by the network system recited in claim 31.

35. A computer-readable medium having a computer program accessible therefrom, the computer program comprising instructions for:
   reviewing at least one load test request;
   generating at least one load test based on one load test request;
   allocating at least one load test to at least one load cell;
   sending respective load test data in accordance with the load test from the load cells to at least one of a plurality of sites under test (SUTs) to conduct the load test;
   receiving responses with at least one load cell to the load test data from the SUTs; and
   generating at least one load test report based on the received responses.

36. The computer program product of claim 35 wherein the computer readable medium includes any of an magnetic storage medium, including disk and tape storage medium; an optical storage medium, including compact disk memory and a digital video disk storage medium; a nonvolatile memory storage memory; a volatile storage medium; and data transmission medium including packets of electronic data and electromagnetic waves modulated in accordance with the instructions.

37. A load test report generated in accordance with the computer program recited in claim 35.

38. An apparatus comprising:
   a means for reviewing at least one load test request;
   a means for generating at least one load test based on one load test request;
   a means for allocating at least one load test to at least one load cell;
   a means for sending respective load test data in accordance with the load test from the load cells to at least one of a plurality of sites under test (SUTs) to conduct the load test;
   a means for receiving responses with at least one load cell to the load test data from the SUTs; and
   a means for generating at least one load test report based on the received responses.

39. The apparatus recited in claim 38 wherein the means for generating at least one load test report based on the received responses further comprises:
   a means for generating a real-time report of the received responses that is accessible to the a user during the load test.

40. The apparatus recited in claim 38 wherein the means for generating at least one load test report based on the received responses further comprises:
   a means for generating a post-test report of the received responses that is accessible to a user after the load test has completed execution.

41. A load test report generated by the apparatus recited in claim 38.

42. An apparatus for load testing a plurality of sites under test (SUTs) in accordance with at least one load test request generated with a user data processing system, the apparatus comprising:
   at least one load cell capable of communicating with the SUTs;
   a load test system capable of communicating with the at least one load cell and the user data processing system, the load tests system having a work allocator capable of (i) receiving the load test request, (ii) querying the at least one load cell to select a group of the load cells which is available to collectively process the load test request, and (iii) selecting the group of load cells to allocate load test tasks to the select group of load cells to collectively process the load test request.

43. The apparatus of claim 42 wherein the at least one load cell further comprises:
   a load cell manager;
   a load cell test executive; and
   a data buffer coupled to the load cell manager and to the load cell test executive.

44. The apparatus of claim 42 wherein the work allocator is capable of (i) receiving a plurality of load test requests, (ii) querying the at least one load cell to select a group of the load cells which is available to collectively process the plurality of load test requests, and (iii) selecting the group of load cells to allocate load test tasks to the select group of load cells to collectively process the plurality of load test requests.

45. A method of load testing at least one site under test (SUT) in accordance with a plurality of concurrently pending load test requests, wherein each of the load test requests provides respective information for load testing at least one SUT, the method comprising:
   reviewing the plurality of load test requests;
   generating a plurality of load tests corresponding to respective one load test requests;
   allocating the load tests to at least one load cell;
   for each of the load tests, sending respective load test data in accordance with the respective load test from the load cells to at least one SUT; and
   receiving responses with the load cells to the respective load test data from at least one SUT.

46. The method as in claim 45 further comprising:
   generating a respective load test report for at least one SUT based on the received responses.

47. A load test report generated in accordance with the method recited in claim 46.

48. The method as in claim 45 further comprising:
   for each of the load tests, sending respective load test data in accordance with the respective load test from the load cells to a plurality of SUTs; and
   receiving responses with the load cells to the respective load test data from the plurality of SUTs.

49. The method as in claim 45 wherein sending further comprises:
   for each of the load tests, serially sending respective load test data in accordance with the respective load test from the load cells to the at least one SUT.

50. The method as in claim 45 wherein sending further comprises:
   for each of the load tests, concurrently sending respective load test data in accordance with the respective load test from the load cells to the at least one SUT.

51. A network system to load test at least one site under test (SUT) in accordance with a plurality of concurrently pending load test requests submitted by at least one user system, the system comprising:
   at least one computer having a processor and a memory coupled to the processor, wherein the processor includes circuitry to receive a plurality of load test requests from at least one user system to load test at least one SUT; and
   program code stored by the memory and executable by the processor, wherein the program code comprises instructions for:

reviewing the plurality of load test requests;
generating a plurality of load tests corresponding to respective one load test requests;
allocating the load tests to at least one load cell;
for each of the load tests, sending respective load test data in accordance with the respective load test from the load cells to at least one SUT; and
receiving responses with the load cells to the respective load test data from at least one SUT.

52. The network system of 51 wherein the processor includes circuitry to receive a plurality of load test requests from a plurality of user systems to load test a plurality of SUTs.

53. The network system of 51 wherein the processor includes circuitry to receive a plurality of load test requests from a plurality of user systems to load test at least one SUT.

54. The network system of 51 wherein the at least one load cell further comprises:
a load cell manager;
a load cell test executive; and
a data buffer coupled to the load cell manager and to the load cell test executive.

55. A computer-readable medium having a computer program accessible therefrom, the computer program comprising instructions for:
reviewing a plurality of load test requests;
generating a plurality of load tests corresponding to respective one load test requests;
allocating the load tests to at least one load cell;
for each of the load tests, sending respective load test data in accordance with the respective load test from the load cells to at least one site under test (SUT); and
receiving responses with the load cells to the respective load test data from at least one SUT.

56. The computer program product of claim 55 wherein the computer readable medium includes any of an magnetic storage medium, including disk and tape storage medium; an optical storage medium, including compact disk memory and a digital video disk storage medium; a nonvolatile memory storage memory; a volatile storage medium; and data transmission medium including packets of electronic data and electromagnetic waves modulated in accordance with the instructions.

57. An apparatus comprising:
a means for reviewing the plurality of load test requests;
a means for generating a plurality of load tests corresponding to respective one load test requests;
a means for allocating the load tests to at least one load cell;
a means sending, for each of the load tests, respective load test data in accordance with the respective load test from the load cells to at least one site under test (SUT); and;
a means for receiving responses with the load cells to the respective load test data from at least one SUT.

58. An apparatus for load testing at least one site under test (SUT) in accordance with a plurality of concurrently pending load test requests generated with a user data processing system, the apparatus comprising:
a plurality of load cells capable of communicating with the SUT;
a load test system capable of communicating with the load cells and the user data processing system, the load test system having a work allocator capable of (i) receiving the plurality of load test requests, (ii) generating a plurality of load tests corresponding to respective one load test requests, (iii) allocating the load tests to at least one load cell, (iv) sending, for each of the load tests, respective load test data in accordance with the respective load test from the load cells to at least one SUT, and (v) receiving responses with the load cells to the respective load test data from at least one SUT.

59. A system for load testing at least one site under test (SUT) in accordance with at least one load test request provided by at least one user system, the apparatus comprising:
a means for receiving communications from the at least one user system, where the means for receiving communications includes a security means for preventing a user system from causing load to be provided to the at least one SUT when the user system is not authorized to load the at least one SUT and also includes a Run Load Test web page;
a means for setting up an account corresponding to the user system, where the means for setting up an account includes a log-in page and also includes one or more Account Setup transaction pages;
a means for creating one or more simulated user scripts based upon input from the user system, the means for creating simulated user scripts including a capture interface and a probe interface, the means for creating simulated user scripts also including a means for saving the simulated user scripts in a memory;
a means for creating one or more scenarios, where the one or more scenarios include one or more of the simulated user scripts;
a means for creating one or more load tests based on the one or more scenarios;
a means for scheduling the one or more load tests for execution;
a means for executing the one or more scheduled load tests;
a means for receiving load test results based on the execution of the one or more scheduled load tests;
a means for processing the load test results to provide report data; and
a means for reporting the report data to the user system.

60. The system of claim 59 wherein the means for reporting the report data to the user system comprises a status home page that includes a means for generating a real-time report of the load test results that is accessible to the user system during the load test.

61. The system of claim 59 wherein the means for reporting the report data to the user system comprises a status home page that includes a means for generating a post-test report of the load test results that is accessible to the user system after the load test has completed execution.

62. The system of claim 59 wherein the capture interface further comprises a means for capturing, cataloguing, and managing simulated user actions without requiring any software modification of the user system.

63. The system of claim 59 wherein the probe interface further comprises a means for automatically probing the at least one SUT to create a random sequence of simulated user actions.

64. The system of claim 59 wherein the capture interface further comprises a capture means for capturing, cataloguing, and managing simulated user actions, the capture means including a software application that is installed on a hardware server associated with the at least one SUT.

65. The system of claim 59 wherein the means for creating one or more simulated user scripts includes a means for editing a previously-created simulated user script saved in a memory.

66. The system of claim 59 wherein the means for creating one or more simulated user scripts includes a means for selecting a previously-created simulated user script saved in a memory.

67. The system of claim 59 wherein:

the means for receiving communications is capable of receiving communications from a plurality of user systems;

the means for creating one or more simulated user scripts is capable of creating a plurality of simulated user scripts associated with each of the plurality of user systems;

the means for creating one or more scenarios is capable of creating a plurality of sets of scenarios, each set of scenarios being associated with one of the plurality of user systems;

the means for creating one or more load tests is capable of creating a plurality of load tests, each of the plurality of load tests being based on one of the scenarios included in the plurality of sets of scenarios;

the means for scheduling is capable of scheduling the plurality of load tests for execution;

the means for executing is capable of executing the plurality of scheduled load tests; and the means for receiving load test results is capable of receiving load test results based on the execution of the plurality of scheduled load tests.

68. The system of claim 59 wherein the means for reporting the report data to the user system is capable of providing real-time review of the user data.

69. The system of claim 59 wherein the means for reporting the report data to the user system provides post-test review of the user data.

70. The system of claim 59 wherein the means for reporting the report data further comprises a Status Home Page.

71. A load test report generated by the system for load testing recited in claim 59.

72. An apparatus that performs at least one load test on at least one site under test (SUT) in accordance with at least one load test request submitted by a user system, the apparatus comprising:

at least one computer having a processor and a memory coupled to the processor, wherein the processor includes circuitry to receive the load test request, the circuitry further including:

a capture subsystem, the capture subsystem being capable of generating at least one captured simulated user script;

a probe subsystem, the probe subsystem being capable of generating at least one random simulated user script;

a load test database that is capable of receiving the at least one captured simulated user script from the capture subsystem and that is also capable of receiving the at least one random simulated user script from the probe subsystem;

a setup subsystem that is configured to receive information from the user system and that is capable of receiving the at least one captured simulated user script from the load test database and that is also capable of receiving the at least one random simulated user script from the load test database;

a FIFO load test request queue that is configured to receive the at least one load test request from the setup subsystem;

a load test system manager that receives the at least one load test request from the FIFO load test request queue and that is configured to send confirmation information corresponding to the at least one load test request to a scheduled/in process database;

a work allocator that is configured to receive the confirmation information from the scheduled/in process database and that is configured to allocate the load test to at least one load cell;

a data collection system that is configured to receive response data from the at least one load cell and to generate formatted data using the response data;

a load test results database that is configured to receive the formatted data from the data collection system; and an internal web control site that is configured to manage at least one internal process that occurs within the circuitry.

73. The apparatus of claim 72 wherein the work allocator is further configured to allocate the load test among a plurality of load cells.

74. The apparatus of claim 73 wherein a computer processing system is logically partitioned to include two or more of the plurality of load cells.

75. The apparatus of claim 73 wherein at least one of the load cells comprising the plurality of load cells comprises more than one computer processing system.

76. The apparatus of claim 72 wherein the capture subsystem is further configured to:

receive a time-sequenced series of actions;

record the time-sequenced series of actions as a captured simulated user script;

save the captured simulated user script in the memory; and assign the saved simulated user script a unique script identifier.

77. The apparatus of claim 76 wherein the capture subsystem is further configured to use the unique script identifier to retrieve the saved simulated user script from the memory.

78. The apparatus of claim 72 wherein the processor includes circuitry to receive the load test request via the Internet.

79. The apparatus of claim 72 wherein the work allocator is further configured to allocate the load test among one or more measurement/QA cells.

80. The apparatus of claim 79 wherein the one or more measurement/QA cells are configured to communicate with the SUT at a connection speed that the user system uses to communicate with the SUT.

81. The apparatus of claim 72 wherein the data collection system is further configured to receive one or more packets of measured data from a load cell manager.

* * * * *